United States Patent
Da Silva et al.

(10) Patent No.: US 10,715,235 B2
(45) Date of Patent: Jul. 14, 2020

(54) DIRECTED WIRELESS COMMUNICATION

(71) Applicant: XR Communications, LLC, Solana Beach, CA (US)

(72) Inventors: Marcus Da Silva, Spokane, WA (US); Vahid Tarokh, Cambridge, MA (US); Praveen Mehrotra, Spokane, WA (US); William J. Crilly, Jr., Liberty Lake, WA (US); James Brennan, Sammamish, WA (US); Robert J. Conley, Liberty Lake, WA (US); Siavash Alamouti, Spokane, WA (US); Eduardo Casas, Vancouver (CA); Hujun Yin, Spokane, WA (US); Bobby Jose, Veradale, WA (US); Yang-Seok Choi, Liberty Lake, WA (US)

(*) Notice: Subject to any disclaimer, the term of this patent is extended or adjusted under 35 U.S.C. 154(b) by 0 days.

(21) Appl. No.: 15/495,539

(22) Filed: Apr. 24, 2017

(65) Prior Publication Data
US 2017/0230094 A1    Aug. 10, 2017

Related U.S. Application Data

(60) Continuation of application No. 15/260,147, filed on Sep. 8, 2016, which is a continuation of application
(Continued)

(51) Int. Cl.
*H04B 7/06* (2006.01)
*H04B 7/04* (2017.01)
(Continued)

(52) U.S. Cl.
CPC ............. *H04B 7/0617* (2013.01); *H04B 7/04* (2013.01); *H04B 7/0621* (2013.01);
(Continued)

(58) Field of Classification Search
None
See application file for complete search history.

(56) References Cited

U.S. PATENT DOCUMENTS

| 4,231,040 A | 10/1980 | Walker |
| 4,750,147 A | 6/1988 | Roy, III et al. |

(Continued)

FOREIGN PATENT DOCUMENTS

| EP | 0817517 A1 | 1/1998 |
| EP | 1117270 A2 | 7/2001 |

(Continued)

OTHER PUBLICATIONS

Anastasi, et. al., "MAC Protocols for Wideband Wireless Local Access: Evolution Towards Wireless ATM", IEEE Personal Communications Magazine, pp. 53-64, Oct. 1998.
(Continued)

*Primary Examiner* — Shuwang Liu
*Assistant Examiner* — Gina M McKie
(74) *Attorney, Agent, or Firm* — Klein, O'Neill & Singh, LLP

(57) ABSTRACT

Disclosed herein are methods and apparatuses configured to direct wireless communication. In some embodiments, a network apparatus is configured to: receive a first signal transmission from a remote station via a first antenna element of an antenna and a second signal transmission from the remote station via a second antenna element of the antenna simultaneously; determine first signal information for the first transmission; determine second signal information for the second transmission, wherein the second signal information is different than the first signal information; determine a set of weighting values based on the first signal information and the second signal information, wherein the set of weighting values is configured to construct one or
(Continued)

more beam-formed transmission signals; and generate the one or more beam-formed transmission signals based on the set of weighting values for transmission to the remote station.

19 Claims, 18 Drawing Sheets

Related U.S. Application Data

No. 13/855,410, filed on Apr. 2, 2013, now Pat. No. 9,462,589, which is a division of application No. 10/700,329, filed on Nov. 3, 2003, now Pat. No. 8,412,106.

(60) Provisional application No. 60/423,660, filed on Nov. 4, 2002.

(51) Int. Cl.
  H04W 16/28       (2009.01)
  H04W 72/04       (2009.01)
  H04B 17/318      (2015.01)

(52) U.S. Cl.
  CPC .......... *H04B 17/318* (2015.01); *H04W 16/28* (2013.01); *H04W 72/046* (2013.01)

(56) References Cited

U.S. PATENT DOCUMENTS

| | | | |
|---|---|---|---|
| 4,965,732 A | 10/1990 | Roy, III et al. | |
| 5,095,531 A | 3/1992 | Ito | |
| 5,327,143 A | 7/1994 | Goetz et al. | |
| 5,345,599 A | 9/1994 | Paulraj et al. | |
| 5,471,647 A | 11/1995 | Gerlach et al. | |
| 5,515,378 A | 5/1996 | Roy, III et al. | |
| 5,546,090 A | 8/1996 | Roy, III et al. | |
| 5,548,813 A | 8/1996 | Charas et al. | |
| 5,553,074 A | 9/1996 | Acampora | |
| 5,592,490 A | 1/1997 | Barratt et al. | |
| 5,602,555 A | 2/1997 | Searle et al. | |
| 5,603,089 A | 2/1997 | Searle et al. | |
| 5,634,199 A | 5/1997 | Gerlach et al. | |
| 5,642,353 A | 6/1997 | Roy, III et al. | |
| 5,649,293 A | 7/1997 | Reed | |
| 5,687,194 A | 11/1997 | Paneth et al. | |
| 5,697,066 A | 12/1997 | Acampora | |
| 5,739,788 A | 4/1998 | Dybdal et al. | |
| 5,771,017 A | 6/1998 | Dean et al. | |
| 5,809,141 A | 9/1998 | Dent et al. | |
| 5,809,422 A * | 9/1998 | Raleigh ................ | H04B 7/2609 455/444 |
| 5,828,658 A | 10/1998 | Ottersten et al. | |
| 5,886,988 A | 3/1999 | Yun et al. | |
| 5,890,067 A | 3/1999 | Chang et al. | |
| 5,914,946 A | 6/1999 | Avidor et al. | |
| 5,933,421 A | 8/1999 | Alamouti et al. | |
| 5,966,094 A | 10/1999 | Ward et al. | |
| 5,987,037 A | 11/1999 | Gans | |
| 6,006,110 A | 12/1999 | Raleigh | |
| 6,049,307 A | 4/2000 | Lim | |
| 6,067,290 A | 5/2000 | Paulraj et al. | |
| 6,091,788 A | 7/2000 | Keskitalo et al. | |
| 6,101,399 A | 8/2000 | Raleigh et al. | |
| 6,104,935 A | 8/2000 | Smith et al. | |
| 6,108,323 A | 8/2000 | Gray | |
| 6,115,427 A | 9/2000 | Calderbank et al. | |
| 6,141,335 A | 10/2000 | Kuwahara et al. | |
| 6,169,759 B1 | 1/2001 | Kanterakis et al. | |
| 6,169,910 B1 | 1/2001 | Tamil et al. | |
| 6,208,858 B1 | 3/2001 | Antonio et al. | |
| 6,219,561 B1 | 4/2001 | Raleigh | |
| 6,233,466 B1 | 5/2001 | Wong et al. | |
| 6,311,075 B1 | 10/2001 | Bevan et al. | |
| 6,330,460 B1 | 12/2001 | Wong et al. | |
| 6,337,659 B1 | 1/2002 | Kim | |
| 6,345,188 B1 | 2/2002 | Keskitalo et al. | |
| 6,351,499 B1 | 2/2002 | Paulraj et al. | |
| 6,359,923 B1 | 3/2002 | Agee et al. | |
| 6,414,986 B1 | 7/2002 | Usui | |
| 6,438,376 B1 | 8/2002 | Elliott et al. | |
| 6,470,195 B1 | 10/2002 | Meyer | |
| 6,501,955 B1 | 12/2002 | Durrant et al. | |
| 6,564,036 B1 | 5/2003 | Kasapi | |
| 6,597,678 B1 | 7/2003 | Kuwahara et al. | |
| 6,611,231 B2 | 8/2003 | Crilly, Jr. et al. | |
| 6,611,695 B1 | 8/2003 | Periyalwar | |
| 6,628,235 B2 | 9/2003 | Wight | |
| 6,631,277 B2 | 10/2003 | Berg et al. | |
| 6,665,545 B1 | 12/2003 | Raleigh et al. | |
| 6,667,712 B2 | 12/2003 | Ericson et al. | |
| 6,687,492 B1 | 2/2004 | Sugar et al. | |
| 6,694,154 B1 | 2/2004 | Molnar et al. | |
| 6,714,584 B1 * | 3/2004 | Ishii ...................... | H04B 7/086 375/144 |
| 6,748,216 B1 | 6/2004 | Lee | |
| 6,778,988 B2 | 8/2004 | Bengtson | |
| 6,795,409 B1 | 9/2004 | Youssefmir et al. | |
| 6,823,174 B1 | 11/2004 | Masenten et al. | |
| 6,850,741 B2 | 2/2005 | Lei et al. | |
| 6,853,333 B2 | 2/2005 | Ericson et al. | |
| 6,907,269 B2 | 6/2005 | Yamaguchi et al. | |
| 6,982,968 B1 | 1/2006 | Barratt et al. | |
| 7,020,110 B2 | 3/2006 | Walton et al. | |
| 7,031,266 B1 | 4/2006 | Patel et al. | |
| 7,031,336 B2 | 4/2006 | Scherzer et al. | |
| 7,039,441 B1 | 5/2006 | Reudink et al. | |
| 7,054,662 B2 | 5/2006 | Judson | |
| 7,062,294 B1 | 6/2006 | Rogard et al. | |
| 7,062,296 B2 | 6/2006 | Brennan et al. | |
| 7,133,380 B1 | 11/2006 | Winters et al. | |
| 7,289,826 B1 | 10/2007 | Hovers et al. | |
| 7,346,365 B1 | 3/2008 | Hovers et al. | |
| 7,492,743 B2 | 2/2009 | Uhlik | |
| 7,529,305 B1 | 5/2009 | Tong et al. | |
| 7,729,728 B2 | 6/2010 | Brennan et al. | |
| 8,412,106 B2 | 4/2013 | da Silva et al. | |
| 9,462,589 B2 | 10/2016 | Da Silva | |
| 2001/0003443 A1 | 6/2001 | Velazquez et al. | |
| 2001/0033600 A1 | 10/2001 | Yang et al. | |
| 2002/0034967 A1 | 3/2002 | Taniguchi et al. | |
| 2002/0097700 A1 | 7/2002 | Alastalo et al. | |
| 2002/0103013 A1 | 8/2002 | Watson et al. | |
| 2002/0137538 A1 * | 9/2002 | Chen .................... | H04B 7/0491 455/575.7 |
| 2002/0158801 A1 * | 10/2002 | Crilly, Jr. ................ | G01S 13/74 342/378 |
| 2003/0017853 A1 | 1/2003 | Kanamaluru et al. | |
| 2003/0064752 A1 | 4/2003 | Adachi et al. | |
| 2003/0073465 A1 | 4/2003 | Li | |
| 2003/0114196 A1 | 6/2003 | Chitrapu | |
| 2004/0014429 A1 | 1/2004 | Guo | |
| 2004/0063468 A1 | 4/2004 | Frank | |
| 2004/0066762 A1 | 4/2004 | Alastalo | |
| 2012/0009964 A1 * | 1/2012 | Gormley ............. | H04B 7/0634 455/509 |
| 2013/0094454 A1 * | 4/2013 | Soriaga ................ | H04B 7/0691 370/329 |

FOREIGN PATENT DOCUMENTS

| | | |
|---|---|---|
| GB | 2349045 A | 10/2000 |
| WO | WO 96/21117 | 7/1996 |
| WO | WO 97/00543 A1 | 1/1997 |
| WO | WO 97/33388 A1 | 9/1997 |
| WO | WO 98/09381 A1 | 3/1998 |
| WO | WO 98/18271 A3 | 4/1998 |
| WO | 9921391 A2 | 4/1999 |
| WO | WO 99/21391 A2 | 4/1999 |
| WO | WO 00/38455 A1 | 6/2000 |
| WO | WO 00/038455 A1 | 6/2000 |

(56) References Cited

FOREIGN PATENT DOCUMENTS

| WO | WO 00/72464 A1 | 11/2000 |
|----|----------------|---------|
| WO | WO 01/010156 A1 | 2/2001 |
| WO | WO 01/10156 A1 | 2/2001 |
| WO | WO 02/063836 A2 | 8/2002 |
| WO | WO 03/075396 A2 | 9/2003 |

OTHER PUBLICATIONS

Berg, J., "Building penetration loss along urban street microcells," in Proceedings of PIMRC '96—7th International Symposium on Personal, Indoor, and Mobile Communications, 3:795-797 (1996).
Damoss, E. and L. Correia, eds., COST 231 Final Report—Digital Mobile Radio—Towards Future Generation Systems. European Commission, Directorate General XIII, Report No. RJR 18957 (ISBN 92-828-54167), 516 pages. (1999).
Deng, S., "Empirical Model of WWW Document Arrivals at Access Link," Communications, 1996. ICC '96, Conference Record, Converging Technologies for Tomorrow's Applications. 1996 IEEE International Conference, 197-202 (1996).
Gans et al., "High data rate indoor wireless communications using antenna arrays," in Proceedings of 6th International Symposium on Personal, Indoor and Mobile Radio Communications, 3:1040-1046 (1995).
German et al., "Wireless Indoor Channel Modeling: Statistical Agreement of Ray Tracing Simulations and Channel Sounding Measurements," in Proceeding of 2001 IEEE International Conference on Acoustics, Speech, and Signal Processing, 4:2501-2504 (2001).
Gucsalla, R., "Characterizing the Variability of Arrival Processes with Indexes of Dispersion", IEEE JSAC, 9(2):203-211 (1990).
Hashemi, H., "The Indoor Propagation Channel," Proceedings of the IEEE, 81 (7): 943-968 (1993).
Jakes, W.C., ed., Microwave Mobile Communications. Wiley, 1974. 645 pages.
Kivinen et al., "Empirical Characterization of Wide hand Indoor radio Channel at 5.3 GHz," IEEE Transactions on Antennas and ProtJagation, 49(8): 1192-1203 (2001).
Leland et. Al., "On the Self-Similar Nature of Ethernet Traffic," IEEE/ACM Transactions on Networking, 2(1):1-15 (1994).
Medbo, J. and J. Berg, "Simple and accurate path loss modeling at 5 GHz in indoor environments with corridors," in Vehicular Technology Conference Fall 2000. IEEE VTS Fall VTC2000. 52nd Vehicular Technology Conference, 1:30-36 (2000).
"Part 11: Wireless LAN Medium Access Control (MAC) and Physical Layer (PHY) specifications: Higher-Speed Physical Layer Extension in the 2.4 GHz Band", Supplement to IEEE Standard for Information technology—Telecommunications and information exchange between systems—Local and metropolitan area networks—Specific requirements. IEEE Std 802.11b-1999(R2003); Sponsor LAN/MAN Standards Committee of the IEEE Computer Society; Reaffirmed Jun. 12, 2003, Approved Sep. 16, 1999, IEEE-SA Standards Board.
Martin Cooper, "A Layman's Guide to Cellular, Annual Review of Communications", 1996, pp. 993-997.
Anderson et al., "An Adaptive Array for Mobile Communication Systems", IEEE Transactions on Vehicular Technology, vol. 40, No. 1, Feb. 1991, pp. 230-236.
G. J. Foschini et al., "BLAST: Bell Labs Layered Space-Time, An Architecture for Realizing Very High Data Rates Over Fading Wireless Channels", https://web.archive/org/web/19990221074508/ https://www.bell-labs.com/pr, Lucent Technologies, 1998, 3 pages.
Brandenburg, L. H. et al., "Capacity of the Gaussian Channel With Memory: The Multivariate Case", The Bell System Technical Journal, vol. 63, No. 5, May-Jun. 1974, pp. 745-764.
Dean Chapman, "First-Hand: Sidelobe Cancellers and the Like", http:ethw.org/First-Hand:Sidelobe_Cancellers_and_the_Like, Apr. 12, 2017, 4 pages.

Li, Hang et al., "Coded Beamforming for Block Fading Vector Channel", 2001 IEEE, pp. 1137-1141.
Dandekar, K.R. et al., "Effect of mutual coupling on direction finding in smart antenna applications", Electronics Letters, vol. 36, No. 22, Oct. 26, 2000, pp. 1889-1891.
L. Bigler, H.P. et al., "Experimental Direction of Arrival and Spatial Signature Measurements at 900 MHz for Smart Antenna Systems", 1995 IEEE, pp. 55-58.
Jeng, Shiann-Shiun et al., "Experimental Evaluation of Smart Antenna System Performance for Capacity Improvement", 1997 IEEE, pp. 369-373.
Jeng, Shiann-Shiun et al., "Experimental Evaluation of Smart Antenna System Performance for Wireless Communications", IEEE Transactions on Antennas and Propagation, vol. 46, No. 6, Jun. 1998, pp. 749-757.
Xu, G. et al., "Experimental Studies of Space-Division-Multiple-Access Schemes for Spectral Efficient Wireless Communications", 1994 IEEE, pp. 800-804.
Jeng, Shiann-Shiun et al., "Experimental Studies of Spatial Signature Variation at 900 MHz for Smart Antenna Systems", IEEE Transactions on Antennas and Propagation, vol. 46, No. 7, Jul. 1998, pp. 953-962.
Fenn, Alan J. et al., "The Development of Phased-Array Radar Technology", Lincoln Laboratory Journal, vol. 12, No. 2, 2000, pp. 321-340.
Foschini, Gerard J., "Layered Space-Time Architecture for Wireless Communication in a Fading Environment When Using Multi-Element Antennas", Bell Labs Technical Journal, Autumn 1996, pp. 41-59.
"Part 11: Wireless LAN Medium Access Control (MAC) and Physical Layer (PHY) specifications High-speed Physical Layer in the 5 GHz Band", Supplement to IEEE Standard for Information technology—Telecommunications and information exchange between systems—Local and metropolitan area networks—Specific requirements. IEEE Std 802.11a-1999(R2003); Sponsor LAN/MAN Standards Committee of the IEEE Computer Society; Reaffirmed Jun. 12, 2003, IEEE-SA Standards Board.
Cooper, Martin, et al., "Intelligent Antennas: Spatial Division Multiple Access", Annual Review of Communications, 1996, pp. 999-1002.
Kaye, A. Roger, et al., "Transmission of Multiplexed PAM Signals Over Multiple Channel and Diversity Systems", IEEE Transactions on Communication Technology, vol. Com-18, No. 5, Oct. 1970, pp. 520-526.
Kang, Joonhyuk, et al., Low Complexity Array Response Vector Estimation for Smart Antenna Systems, 2000 IEEE, pp. 841-845.
Dandekar, Kapil R., et al., "Modeling and Prediction of the Wireless Vector Channel Encountered by Smart Antenna Systems", Microwave and Optical Technology Letters, vol. 35, No. 4, Nov. 20, 2002, pp. 281-283.
Swales, S.C., et al., "Multi-Beam Adaptive Base-Station Antennas for Cellular Land Mobile Radio Systems", 1989 IEEE 39th Vehicular Technology Conference, San Francisco, vol. 1, pp. 341-348.
Balaban, Philip, et al., "Optimum Diversity Combining and Equalization in Digital Data Transmission with Applications to Cellular Mobile Radio—Part 1: Theoretical Considerations", IEEE Transactions on Communications, vol. 40, No. 5, May 1992, pp. 885-894.
Naguib, Ayman F., et al., "Performance of CDMA Cellular Networks With Base-Station Antenna Arrays: The Downlink", 1994 IEEE, pp. 795-799.
Cadzow, J.A., et al., "Resolution of Coherent Signals Using a Linear Array", 1987 IEEE, pp. 1597-1600.
Reudink, D.O., et al., "A Scanning Spot-Beam Satellite System", The Bell System Technical Journal, vol. 56, No. 8, Oct. 1997, pp. 1549-1560.
Nowicki, David, et al., "Smart Antenna Strategies", Mobile Communications Int'l, Apr. 1995, pp. 1-10.
Xu, Guanghan, et al., "Smart Antenna Systems for Wireless Communications", 1998 IEEE, pp. 631-634.
Paulraj, Arogyaswami J., et al., "Space-Time Processing for Wireless Communications", IEEE Signal Processing Magazine, Nov. 1997, pp. 49-83.

(56) References Cited

OTHER PUBLICATIONS

Winters, Jack H., et al., "The Impact of Antenna Diversity on the Capacity of Wireless Communication Systems", IEEE Transactions on Communications, vol. 42, No. 2/3/4, Feb./Mar./Apr. 1994, pp. 1740-1751.

Goldburg, Mark, et al., "The Impacts of SDMA on PCS System Design", IEEE, 1994, Session 1.10, ArrayComm, Inc., Santa Clara, CA, pp. 242-246.

Li, Hang, et al., "Transmission Optimization Over Flat Rayleigh Fading Channel with Multiple Antennas", 1999 IEEE, pp. 210-214.

Van Etten W., "Maximum Likelihood Receiver for Multiple Channel Transmission Systems", IEEE Transactions on Communications, Feb. 1976, pp. 276-283.

Kavak, Adnan, et al., "Vector Channels for Smart Antennas-Measurements, Statistical Modeling, and Directional Properties in Outdoor Environments", IEEE Transactions on Microwave Theory and Techniques, vol. 48, No. 6, Jun. 2000, pp. 930-937.

Related Virtual Exhibits, Smart Antenna Systems Tutorial, IEC ComForum at WCA 2001: Jun. 25-27, 2001, World Trade Center, Boston, MA, USA.

Raleigh, G.G., et al., "Adaptive Antenna Transmission for Frequency Duplex Digital Wireless Communication", 1997 IEEE, pp. 641-646.

Gerlach, Derek, "Adaptive Transmitting Antenna Arrays at the Base Station in Mobile Radio Networks", Aug. 1995, UMI Company, Ann Arbor, MI, 108 pages.

Gerlach, Derek et al., "Adaptive Transmitting Antenna Arrays with Feedback", IEEE Signal Processing Letters, vol. 1, No. 10, Oct. 1994, pp. 150-152.

Lehne, Per H., et al. "An Overview of Smart Antenna Technology for Mobile Communications Systems", IEEE Communications Surveys, http://www.comsoc.org/pubs/surveys, Fourth Quarter 1999, vol. 2, No. 4, pp. 2-13.

Gerlach, Derek et al., "Base station transmitting antenna arrays for multipath environments", Signal Processing 54 (1996) pp. 59-73.

Naguib, Ayman F., et al. "Capacity Improvement of Base-Station Antenna Arrays Cellular CDMA", 1993 IEEE, pp. 1437-1441.

Liang et al; "Forward link antenna diversity using feedback for indoor communication systems", IEEE, 1995 International Conference on Acoustics, Speech, and Signal Processing, vol. 3, pp. 1753-1755.

Paulraj, Arogyaswami; "Smart antennas for battlefield multimedia wireless networks with dual use applications", Army Research Office, Grant No. DAAH04-95-1-0249, Aug. 15, 1998, 1-22.

Anthony S. Acampora et al., "A New Adaptive MAC Layer Protocol for Broadband Packet Wireless Networks in Harsh Fading and Interference Environments", IEEE/ACM Transactions on Networking, vol. 8, No. 3, Jun. 2000, pp. 328-336.

Anthony S. Acampora et al., "A New Adaptive MAC Layer Protocol for Wireless ATM Networks in Harsh Fading and Interference Environments", IEEE, 1997, Center for Wireless Communications, University of California, San Diego, pp. 410-415.

Anthony S. Acampora et al., "A Wireless Network for Wide-Band Indoor Communications", IEEE Journal on Selected Areas in Communications, vol. SAC-5, No. 5, Jun. 1987, pp. 796-805.

A. S. Acampora et al., "System Applications for Wireless Indoor Communications", IEEE Communications Magazine, Aug. 1987, vol. 25, No. 8, pp. 11-20.

G.J. Foschini et al., "On Limits of Wireless Communications in a Fading Environment When Using Multiple Antennas", Wireless Personal Communications 6, Kluwer Academic Publishers, 1998, Netherlands, pp. 311-335.

Supplement to IEEE Standard for Information technology—Telecommunications and information exchange between systems—Local and metropolitan area networks—Specific requirements, "Part 11: Wireless LAN Medium Access Control (MAC) and Physical Layer (PHY) specifications, High-speed Physical Layer in the 5 GHz Band", IEEE-SA Standards Board, Jun. 12, 2003, IEEE Std 802.11a-1999(R2003), 91 pages.

Supplement to IEEE Standard for Information technology—Telecommunications and information exchange between systems—Local and metropolitan area networks—Specific requirements, "Part 11: Wireless LAN Medium Access Control (MAC) and Physical Layer (PHY) specifications: Higher-Speed Physical Layer Extension in the 2.4 GHz Band", IEEE Std 802.11b-1999 (R2003), Institute of Electrical Engineers, Inc., Jan. 20, 2000, U.S.A., 96 pages.

Krishnamurthy, S.et al., "Polling Based Media Access Protocols for Use With Smart Adaptive Array Antennas", Conference Record, International Conference on Universal Personal Communications, Florence, Oct. 1998.

Krishnamurthy, S.V. et al.; "Polling-Based Media Access Protocols for Use with Smart Adaptive Array Antennas," IEEE/ACM Trans. Networking vol. 9, No. 2, Apr. 2001.

Interface, Feb. 1999, pp. 176-181; Interface, Mar. 1999, pp. 168-173. (Japanese)

Wolniansky, P. W. et al., "V-Blast: An Architecture for Realizing Very High Data Rates Over the Rich-Scattering Wireless Channel," Proc. URSI ISSSE: 295-300, Sep. 1998.

Winters, J.H. "Optimum Combining in Digital Mobile Radio with Cochannel Interference", IEEE Journal on Selected Areas in Communications, vol. SAC-2, No. 4, Jul. 1984.

Zhang, Z. et al., "Performance of a Modified Polling Strategy for Broadband Wireless LANs in a Harsh Fading Environment," IEEE GLobecom '91 Conference Record, Dec. 1991, Phoenix.

Acampora, A.S. et al., "Media Access Protocols for Use with Smart Adaptive Array Antennas to Enable Wireless Multimedia Applications", 9th Tyrrehenian Workshop on Digital Communications, Lerici (Italy), Sep. 1997.

Zhang, Z. et al., "Performance of a Modified Polling Strategy for Broadband Wireless Access in a Harsh Fading Environment," Telecommunication Systems, vol. 1, No. 3, 1993, p. 279-294.

*XR Communications, LLC, dba Vivato Technologies v. D-Link Systems, Inc., et al.*, Case No. 8:17-cv-0596-AG(JCGx), Defendants' Invalidity Contentions Pursuant to Standing Patent Rules 2.5 and 2.6, dated Nov. 10, 2017, 85 pages.

D. Gerlach and A. Paulraj, "*Base Station Transmitter Arrays with Mobile to Base Feedback*," Conference Record of the Twenty-Seventh Asilomar Conference on Signals, Systems& Computers, 1993, pp. 1432-1436.

I.A. Glover and P.M. Grant, *Digital Communications*, Prentice Hall Europe, 1998, pp. 80-86, § 2.6, "Correlation functions".

ANSI/IEEE Standard 802.11: Wireless LAN Medium Access Control (MAC) and Physical Layer (PHY) Specifications, 1999 Edition.

Z.C. Fluhr and P.T. Porter, "*Advanced Mobile Phone Service: Control Architecture*," Bell System Technical Journal, vol. 58, No. 1, Jan. 1979, pp. 43-69 ("Fluhr").

Hillebrand, ed., "*GSM and UMTS: The Creation of Global Mobile Communication*,"John Wiley & Sons, Ltd., 2002, pp. 316-317 ("Hillebrand").

Andrew T. Campbell, et al., "Design, Implementation, and Evaluation of Cellular IP," IEEE Personal Communications (Aug. 2000).

Donghee Shim, et al., "Should the Smart Antenna Be a Tracking Beam Array or Switching Beam Array?," $48^{th}$ IEEE Vehicular Technology Conference (VTC'98) (May 21, 1998).

Sandra Kay Miller, "Facing the Challenge of Wireless Security," Computer, pp. 16-18 (Jul. 2001).

IEEE 802.11-1997.

Jack H. Winters, "Smart Antennas," Chapter 6 of WTEC Panel Report on Wireless Technologies and Information Networks (Jul. 2000).

Constantine Balanis, Antenna Theory (1997) (selected pages).

S.C. Swales, et al., "The Performance Enhancement of Multibeam Adaptive Base-Station Antennas for Cellular Land Mobile Radio Systems," IEEE Transactions on Vehicular Technology, vol. 39, No. 1 (Feb. 1990).

John Litva, et al., Digital Beamforming in Wireless Networks (1996) (selected pages).

Joseph C. Liberti, Jr., et al., Smart Antennas for Wireless Communications (1999) (selected pages).

IEEE Standards Bearer (Oct. 1997).

(56) References Cited

OTHER PUBLICATIONS

Oliver C. Ibe, Essentials of ATM Networks and Services, Addison Wesley (1997).
Andrew S. Tanenbaum, Computer Networks, Third Edition, Prentice Hall (1996).
Bellafiore et al., "Smart antenna system analysis, integration and performance for mobile ad-hoc networks (MANETs), " in IEEE Transactions on Antennas and Propagation, vol. 50, No. 5, pp. 571-581, May 2002 (Year: 2002).
Lal et al., "A novel MAC layer protocol for space division multiple access in wireless ad hoc networks, " Proceedings. Eleventh International Conference on Computer Communications and Networks, Miami, FL, USA, 2002, pp. 614-619 (Year: 2002).

\* cited by examiner

DIRECTED WIRELESS COMMUNICATION

CROSS-REFERENCE TO RELATED APPLICATIONS

This application is a continuation of U.S. application Ser. No. 15/260,147, filed Sep. 8, 2016, which is a continuation application of U.S. patent application Ser. No. 13/855,410, filed on Apr. 2, 2013 (now U.S. Pat. No. 9,462,589), which is a divisional application of U.S. patent application Ser. No. 10/700,329, filed on Nov. 3, 2003 (now U.S. Pat. No. 8,412,106), which claims the benefit of U.S. Provisional Application No. 60/423,660, filed on Nov. 4, 2002. Each of the above-referenced patent applications is incorporated herein by reference in its entirety.

BACKGROUND

The following disclosure relates to directed wireless communication.

Computing devices and other similar devices implemented to send and/or receive data can be interconnected in a wired network or wireless network to allow the data to be communicated between the devices. Wired networks, such as wide area networks (WANs) and local area networks (LANs) for example, tend to have a high bandwidth and can therefore be configured to communicate digital data at high data rates. One obvious drawback to wired networks is that the range of movement of a device is constrained since the device needs to be physically connected to the network for data exchange, For example, a user of a portable computing device will need to remain near to a wired network junction to maintain a connection to the wired network.

An alternative to wired networks is a wireless network that is configured to support similar data communications but in a more accommodating manner. For example, the user of the portable computing device can move around within a region that is supported by the wireless network without having to be physically connected to the network. A limitation of conventional wireless networks, however, is their relatively low bandwidth which results in a much slower exchange of data than a wired network. Further, conventional wireless networks are implemented with multiple base stations, or access points, that relay communications between wireless-configured devices. These conventional access points have a limited communication range, typically 20 to 200 feet, and a wireless network requires a large number of these access points to cover and provide a communication link over a large area.

Many conventional wireless communication systems and networks implement omni-directional antennas to transmit data packets to a client device and receive data packets from or via an access point. With a standard wireless LAN, for example, a transmission is communicated equally in all directions from an omni-directional antenna, or point of emanation. Receiving devices located within range and positioned at any angle with respect to the emanating point can receive the wireless transmission.

However, standard omni-directional wireless LANs or omni-directional wireless wide area networks (WANs) have drawbacks and limitations. For example, transmission range is limited and electromagnetic interference associated with transmissions is unmanaged and can interfere with or otherwise restrict the use of other communicating devices that operate in the same frequency band within the transmission coverage area. Furthermore, inefficiencies and data corruption can occur if two or more centralized points of emanation are positioned proximate to have overlapping coverage areas.

SUMMARY

Directed wireless communication is described herein. In an implementation, a multi-beam directed signal system coordinates directed wireless communication with client devices. A transmit beam-forming network routes data communication transmissions to the client devices via directed communication beams that are emanated from an antenna assembly, and a receive beam-forming network receives data communication receptions from the client devices via the directed communication beams.

BRIEF DESCRIPTION OF THE DRAWINGS

The same numbers are used throughout the drawings to reference like features and components.

DETAILED DESCRIPTION OF CERTAIN EMBODIMENTS

Figure 1:
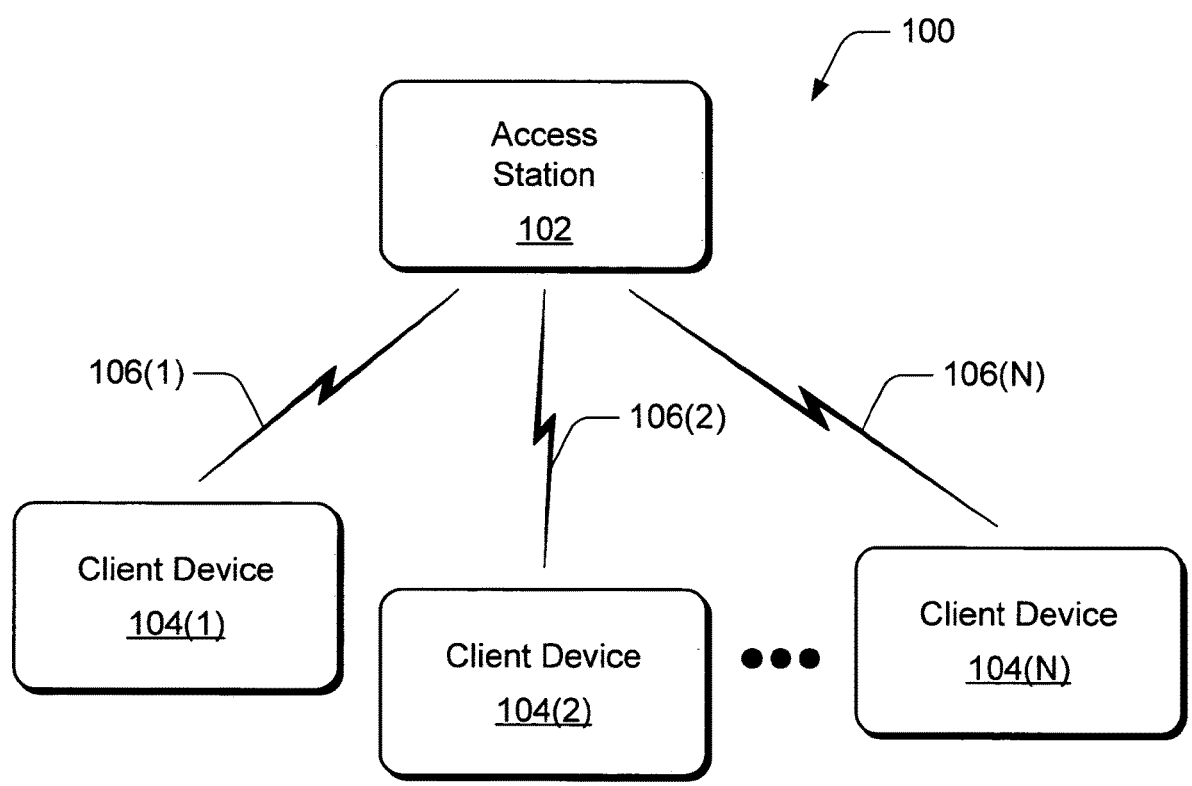
FIG. 1 illustrates an exemplary wireless communications environment.

Directed wireless communication is described in which a multi-beam directed signal system is implemented to communicate over a wireless communication link via an antenna assembly with client devices implemented for wireless communication within the wireless system. The directed wireless communication system can be implemented to communicate with multiple devices, such as portable computers, computing devices, and any other type of electronic and/or communication device that can be configured for wireless communication. Further, the multiple electronic and/or computing devices can be configured to communicate with one another within the wireless communication system. Additionally, a directed wireless communication system can be implemented as a wireless local area network (WLAN), a wireless wide area network (WAN), a wireless metropolitan area network (MAN), or as any number of other similar wireless network configurations.

The following description identifies various systems and methods that may be included in such directed wireless communication systems and networks. It should be noted, however, that these are merely exemplary and that not all of the techniques described herein need be implemented in a given wireless system or network. Furthermore, many of the exemplary systems and methods described herein are also applicable and/or adaptable for use in other communication systems and networks.

Directed wireless communication provides improved performance over conventional wireless network arrangements by utilizing multi-beam receiving and/or transmitting adaptive antennas, when practical. In an implementation, simultaneous transmission and reception may occur at a wireless routing device by applying multi-channel techniques. In a described implementation, a multi-beam directed signal system (e.g., also referred to as an access point or Wi-Fi switch) is a long-range packet switch designed to support 802.11b clients in accordance with an 802.11 standard. An increase in communication range is achieved by beam-forming directed communication beams which simultaneously transmit directed signals and receive communication signals from different directions via receive and transmit beam-forming networks.

The multi-beam directed signal system establishes multiple point-to-point links (e.g., directed communication beams) by which data packets can be communicated. The point-to-point links have a communication range that covers a much larger area than conventional access points, eliminating the need for multiple communication access points and significantly reducing the complexity and cost of a wireless LAN (WLAN) network. Further, a client device can use a conventional wireless card to communicate with the multi-beam directed signal system over long distances with no modification of the client device. Accordingly, directed wireless communication as described herein represents a significant improvement over conventional wireless networks that use switched beam and/or omni-directional antennas.

FIG. 1 illustrates an exemplary wireless communications environment 100 that is generally representative of any number of different types of wireless communications environments, including but not limited to those pertaining to wireless local area networks (LANs) or wide area networks (WANs) (e.g., Wi-Fi compatible) technology, cellular technology, trunking technology, and the like. In wireless communications environment 100, an access station 102 communicates with remote client devices 104(1), 104(2), . . . , 104(N) via wireless communication or communication links 106(1), 106(2), . . . , 106(N), respectively. Although not required, access station 102 is typically fixed, and remote client devices 104 may be fixed or mobile. Although only three remote client devices 104 are shown, access station 102 can wirelessly communicate with any number of different client devices 104.

A directed wireless communication system, Wi-Fi communication system, access station 102, and/or remote client devices 104 may operate in accordance with any IEEE 802.11 or similar standard. With respect to a cellular system, for example, access station 102 and/or remote client devices 104 may operate in accordance with any analog or digital standard, including but not limited to those using time division/demand multiple access (TDMA), code division multiple access (CDMA), spread spectrum, some combination thereof, or any other such technology.

Access station 102 can be implemented as a nexus point, a trunking radio, a base station, a Wi-Fi switch, an access point, some combination and/or derivative thereof, and so forth. Remote client devices 104 may be, for example, a hand-held device, a desktop or laptop computer, an expansion card or similar that is coupled to a desktop or laptop computer, a personal digital assistant (FDA), a mobile phone, a vehicle having a wireless communication device, a tablet or hand/palm-sized computer, a portable inventory-related scanning device, any device capable of processing generally, some combination thereof, and the like. Further, a client device 104 may be any device implemented to receive and/or transmit information (e.g., in the form of data packets) via the applicable wireless communication links 106. Remote client devices 104 may also operate in accordance with any standardized and/or specialized technology that is compatible with the operation of access station 102.

Figure 2:
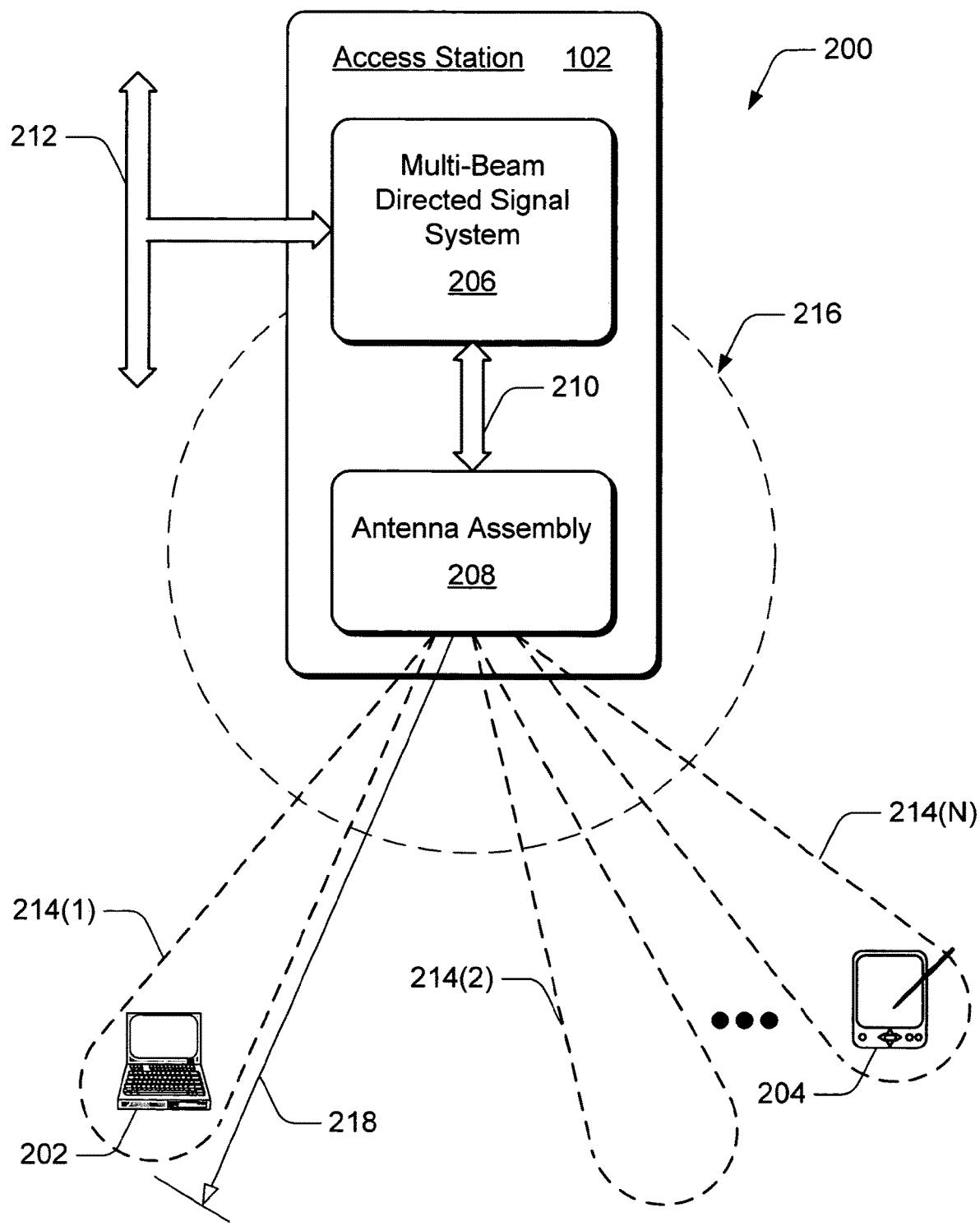
FIG. 2 illustrates an exemplary directed wireless communication system.

FIG. 2 illustrates an exemplary directed wireless communication system 200 that can be implemented in any form of a wireless communications environment 100 as described with reference to FIG. 1. The directed wireless communication system 200 includes an access station 102 and remote client devices 202 and 204. The access station 102 includes a multi-beam directed signal system 206 coupled to an antenna assembly 208 via a communication link 210. In this example implementation, access station 102 is coupled to an Ethernet backbone 212.

The antenna assembly 208 can be implemented as two or more antennas, and optionally as a phased array of antenna elements, to emanate multiple directed communication beams 214(1), 214(2), . . . , 214(N). The antenna assembly 208 is an unobtrusive indoor or outdoor Wi-Fi antenna panel that can include various operability components such as RF devices and components, a central processing unit, a power supply, and other logic components. The antenna assembly can be implemented as a lightweight and thin structure that can be mounted on a wall or in a corner of a room to provide wireless communication over a broad coverage area, such as throughout a building and surrounding area, or over an expanded region, such as a college campus or an entire corporate or manufacturing complex. While the antenna assembly may be applicable or adaptable for use in many other communication systems, the antenna assembly is described in the context of an exemplary wireless communications environment 100 (FIG. 1).

The multi-beam directed signal system 206 can transmit and/or receive (i.e., transceive) information (e.g., in the form of data packets) by way of one or more directed communication beams 214 as a wireless communication via the antenna assembly 208. Additionally, wireless communication(s) are transmitted and/or received from (i.e., transceived with respect to) a remote client device, such as client devices 202 and 204. The wireless communications may be transceived directionally with respect to one or more particular communication beams 214. The multi-beam directed signal system 206 can be implemented for multi-channel directed wireless communication. For example, client device 202 can communicate via directed communication beam 214(1) with a first channel of the multi-beam directed signal system 206, and client device 204 can communicate via directed communication beam, 214(N) with a second channel of the multi-beam directed signal system 206.

In the exemplary directed wireless communication system 200, signals may be sent from a transmitter to a receiver using electromagnetic waves that emanate from one or more antenna elements of the antenna assembly 208 which are focused in one or more desired directions. For example, the multi-beam directed signal system generates a directed wireless communication for transmission to wireless client device 202 via directed communication beam 214(1). This is in contrast to conventional omni-directional transmission systems that transmit a communication in all directions from an omni-directional antenna (e.g., example omni-directional transmission area 216 emanating from a central transmission point with reference to antenna assembly 208 and shown only for comparison). Although not to scale, the illustration depicts that the power to transmit over the omni-directional transmission area 216 can be directed as one or more communication beams over a farther distance 218 from a point of transmission (e.g., antenna assembly 208).

When the electromagnetic waves are focused in a desired direction, the pattern formed by the electromagnetic wave is termed a "beam" or "beam pattern", such as a directed communication beam 214. The production and/or application of such electromagnetic beams 214 is typically referred to as "beam-forming." Beam-forming provides a number of benefits such as greater range and/or coverage per unit of transmitted power, improved resistance to interference, increased immunity to the deleterious effects of multi-path transmission signals, and so forth. For example, a single communication beam 214(1) can be directed for communication with a specific wireless-configured client device 202 and can be transmitted over a much greater distance 218 than would be covered by a conventional omni-directional antenna (e.g., example omni-directional transmission area 216 shown only for comparison).

Figure 3:
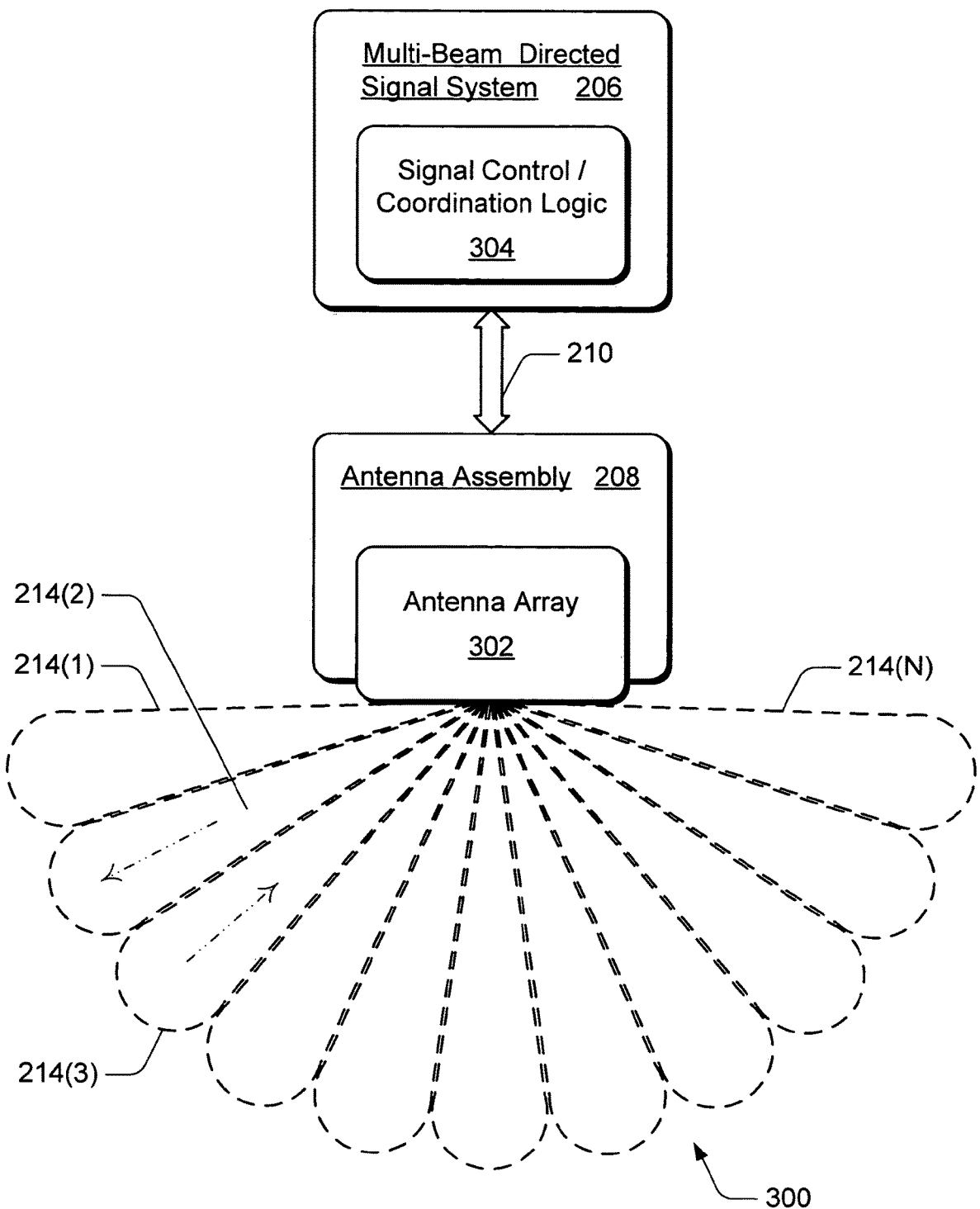
FIG. 3 illustrates an exemplary communication beam array which can be generated with the exemplary directed wireless communication system shown in FIG. 2.

FIG. 3 illustrates an exemplary communication beam array 300 of directed communication beams 214(1), 214(2), . . . 214(N) that emanate from an antenna array 302 which is part of the antenna assembly 208. Antenna assembly 208 is also referred to herein as an "adaptive antenna" which describes an arrangement that includes the antenna array 302 having a plurality of antenna elements, and operatively supporting mechanisms and/or components (e.g., circuits, logic, etc.) that are part of a wireless routing device and configured to produce a transmission pattern that selectively places transmission nulls and/or peaks in certain directions within an applicable coverage area.

A transmission peak of a directed communication beam 214 occurs in the transmission pattern 300 when a generated and particular amount of energy is directed in a particular direction. Transmission peaks are, therefore, associated with the signal path and/or communication beam to a desired receiving node, such as another wireless routing device or a wireless client device. In some cases, sidelobes to a communication beam may also be considered to represent transmission peak(s).

Conversely, a transmission null (e.g., not a communication beam) occurs in the transmission pattern when no transmission of energy occurs in a particular direction, or a relatively insignificant amount of energy is transmitted in a particular direction. Thus, a transmission null is associated with a signal path or lack of a communication beam towards an undesired, possibly interfering, device and/or object. Transmission nulls may also be associated with the intent to maximize power in another direction (i.e., associated with a transmission peak), to increase data integrity or data security, and/or to save power, for example. A determination to direct a transmission null and/or a transmission peak (e.g., a communication beam 214) in a particular direction can be made based on collected or otherwise provided routing information which may include a variety of data associated with the operation of the multi-beam directed signal system 206, wireless routing device, and other devices at other locations or nodes within the wireless network.

One or more of the communication beams 214(1), 214(2), . . . , 214(N) are directed out symmetrically from antenna array 302 to communicate information (e.g., in the form of data packets) with one or more wireless client devices. The communication beam array 300 shown in FIG. 3 is merely exemplary and other communication beam arrays, or patterns, may differ in width, shape, number, angular coverage, azimuth, and so forth. Further, although all of the directed communication beams 214 are shown emanating from antenna array 302 at what would appear as a same time, transmission and reception via one or more communication beams 214 is controlled and coordinated with signal control and coordination logic 304 of the multi-beam directed signal system 206.

The signal control and coordination logic 304 can monitor each of the directed communication beams 214 as an individual access point. Further, the signal control and coordination logic 304 can control a directed wireless transmission to a first client device and a directed wireless transmission from a second client device such that the directed wireless transmission does not interfere with the directed wireless reception. Optionally, a directed wireless transmission and a directed wireless reception can be simultaneous.

As used herein, the term "logic" (e.g., signal control and coordination logic 304) refers to hardware, firmware, software, or any combination thereof that may be implemented to perform the logical operations associated with a given task. Such, logic can also include any supporting circuitry that may be required to complete a given task including supportive non-logical operations. For example, "logic" may also include analog circuitry, memory, input/output (I/O) circuitry, interface circuitry, power providing/regulating circuitry, etc.

The directed communication beams 214 of antenna array 302 can be directionally controllable, such as steerable in an analog implementation or stepable in a digital implementation. For example, a directed communication beam 214 can be directionally stepable by the width (e.g., degrees) of the communication beam to "steer" or "aim" addressable data packets when communicating with a client device. Further, a communication beam 214 can be directionally controllable such that only an intended client device will receive a directed wireless communication via the communication beam 214, and such that an unintended recipient will not be able to receive the directed wireless communication.

Although data signals (e.g., information as data packets) can be directed to and from a particular client device (e.g., client devices 202 and 204) via one or more directed communication beams 214, interference between communications beams 214 can occur. For example, a downlink signal transmission from antenna assembly 208 via communication beam 214(2) can corrupt an uplink signal reception at antenna assembly 208 via communication beam 214(3). The signal control and coordination logic 304 coordinates uplink and downlink signal transmissions across (e.g., between and/or among) the different communication beams 214 so as to avoid, or at least reduce, the frequency at which downlink directed signals are transmitted via a first communication beam (e.g., communication beam 214(2)) while uplink directed signals are being received via a second communication beam (e.g., communication beam 214(3)).

Figure 4:
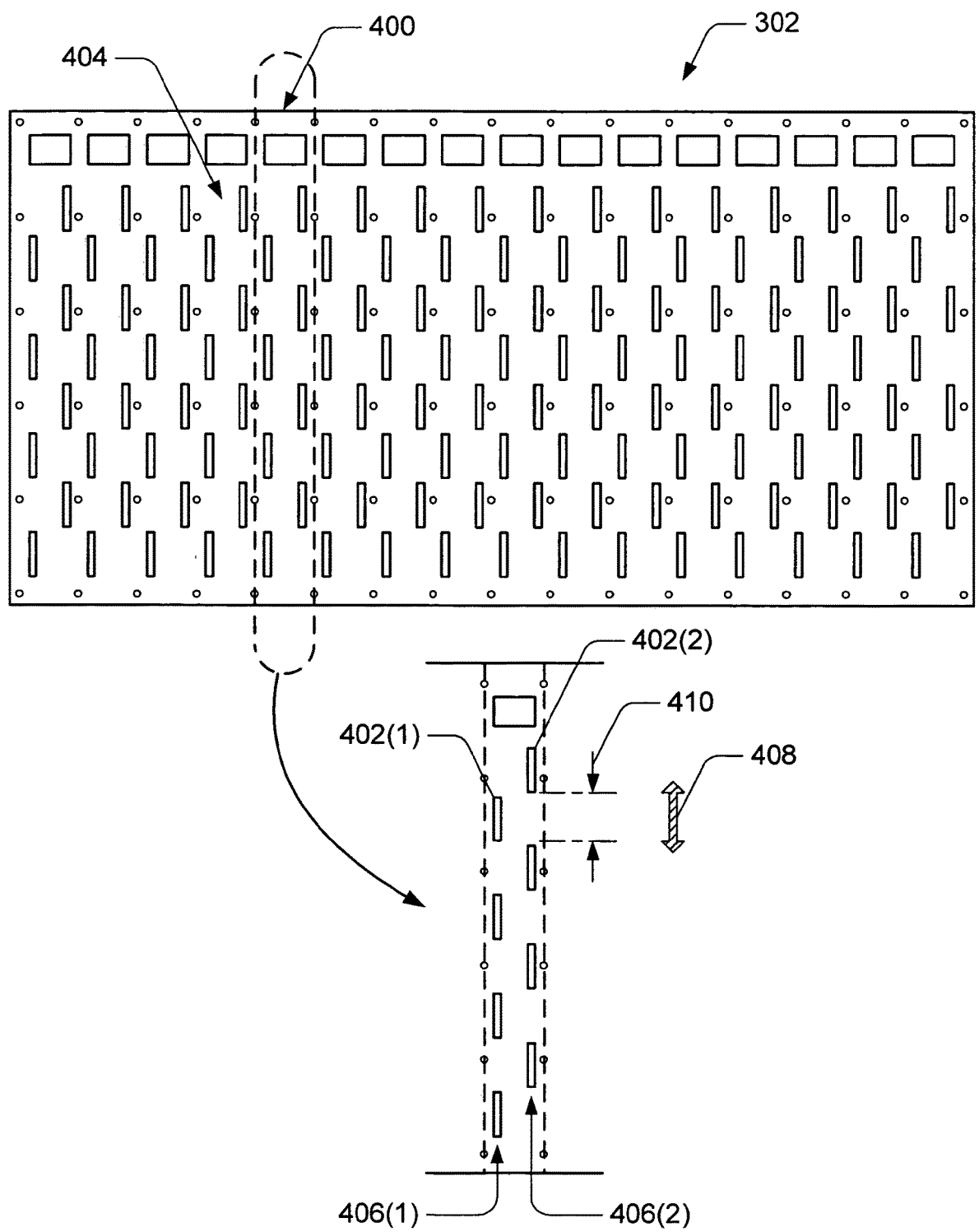
FIG. 4 illustrates an exemplary antenna array for an antenna assembly as shown in FIG. 3.

FIG. 4 illustrates an exemplary antenna array 302 (also referred to herein as an adaptive antenna) that is formed with an array of antenna elements 400. Each antenna element 400 has multiple communication signal transfer slots 402 (e.g., transfer slots 402(1) and 402(2)) that are formed into a front surface 404 of an antenna element 400. The antenna array 302 transmits and receives data as electromagnetic communication signals via the transfer slots 402 in each antenna element 400.

In an exemplary implementation, the communication signal transfer slots 402 in an antenna element 400 are formed into two parallel slot rows 406(1) and 406(2) in which the transfer slots 402(1) in slot row 406(1) are staggered, or otherwise offset, in relation to the transfer slots 402(2) in slot row 406(2). Each transfer slot 402(1) in slot row 406(1) is offset from each transfer slot 402(2) in slot row 406(2) in a direction 408 and a distance 410. For example, transfer slot 402(1) in slot row 406(1) is offset from transfer slot 402(2) in slot row 408(2) in a direction that is parallel to the slot rows 406 (e.g., the direction 408) over a distance that is approximately the length of one rectangular transfer slot 402 (e.g., the distance 410). The distance 410 between transfer slots 402 in a slot row 406 is approximately the antenna element wavelength $\lambda_g/2$ apart.

The gain of an adaptive antenna (e.g., antenna array 302) is dependent on the implementation of the multi-beam directed signal system 206. However, for a uniformly illuminated antenna array, the antenna gain is related to its effective aperture by an equation:

$$G_R = \frac{4\pi \cdot A_{eff}}{\lambda^2}$$

Assuming $A_{eff}$ is equal to a cross-sectional area of the antenna array:

$$G_R = \frac{4\pi \cdot w \cdot h}{\lambda^2}$$

where w is the width of the antenna, h is the height of the antenna, and $\lambda$ is the wavelength. For an example indoor implementation of an antenna array where w=8$\lambda$ and h=4$\lambda$, the antenna gain is determined by the equation:

$$G_R = \frac{4\pi \cdot 8\lambda \cdot 4\lambda}{\lambda^2} = 128\pi = 26 \, \text{dB}i$$

For an example outdoor implementation of an antenna array where w=8$\lambda$ and h=8$\lambda$, the antenna gain is determined by the equation:

$$G_R = \frac{4\pi \cdot 8\lambda \cdot 8\lambda}{\lambda^2} = 256\pi = 29.1 \, \text{dB}i$$

When dissipation losses are zero, the antenna gain is equivalent to directivity. The effective aperture may include the effect of losses, and therefore the formulas may be used to calculate the gain. When the actual dimensions of the antenna array 302 are used as the "effective area", the losses are assumed to be zero (e.g., for an ideal implementation).

In this example illustration, the antenna array 302 is shown configured for indoor use with sixteen antenna elements (e.g., sixteen of antenna elements 400 formed or otherwise positioned together) each having two parallel rows of four communication signal transfer slots each (e.g., slot rows 406(1) and 406(2)). The antenna array 302 can be configured for outdoor use with thirty-two antenna elements (e.g., multiple antenna elements 400) each having two parallel rows of eight communication signal transfer slots each, or can be configured as a larger antenna array or antenna panel with more antenna elements having more communication signal transfer slots per slot row. The antenna array 302 can be configured with as many antenna elements 400 having any number of transfer slots 402 per slot row 406 as needed to provide communication signal transfer (e.g., wireless communication) over a region or desired coverage area.

Figure 5:
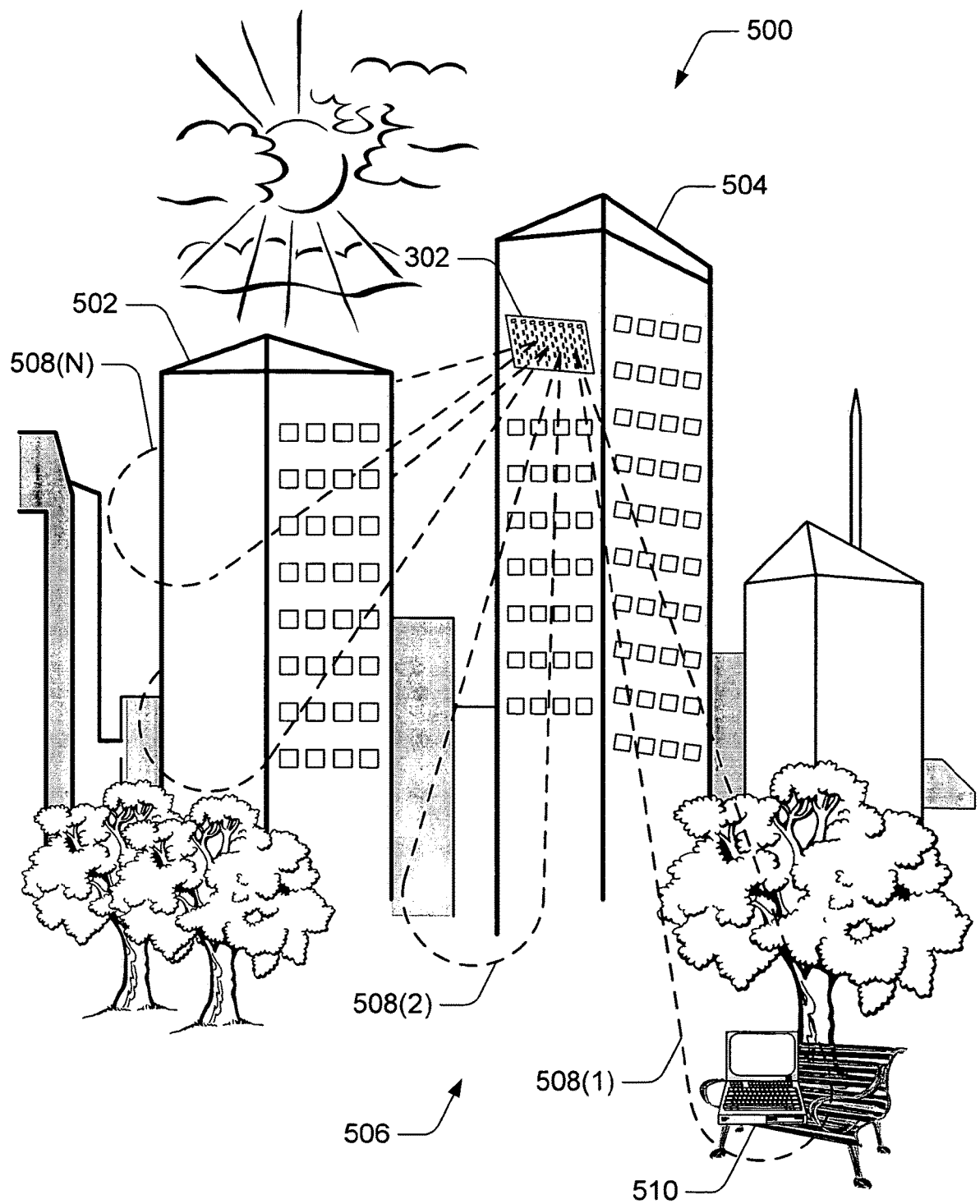
FIG. 5 illustrates an exemplary implementation of the directed wireless communication system shown in FIG. 2.

FIG. 5 illustrates an exemplary implementation 500 of a directed wireless communication system (e.g., directed wireless communication system 200 shown in FIG. 2) that includes antenna assembly 208 and antenna array 302 as shown in FIG. 4. In this example, antenna array 302 is positioned outside of a building 502 and mounted on an adjacent building 504 to provide wireless communication throughout building 502 and throughout a region 506 outside of building 502. The antenna array 302 is coupled to the multi-beam directed signal system 206 (FIG. 2) which can be communicatively coupled via a LAN connection, for example, to a server computing device positioned in building 504. The server computing device can be implemented to administrate and control the associated functions and operations of the directed wireless communication system 200. Alternatively, antenna array 302 can be mounted within building 502 to provide wireless communication throughout building 502 and throughout the region 506 outside of building 502. For example, antenna array 302 can be mounted in a corner between two interior perpendicular walls to provide wireless communication coverage throughout the coverage area (e.g., building 502 and region 506 outside of the building).

The directed wireless communication system 200 (e.g., shown in implementation 500) provides wireless communication of information (e.g., in the form of data packets) via directed communication beams 508(1), 508(2), . . . , 508(N) to any number of electronic and/or computing client devices that are configured to recognize and receive transmission signals from the antenna array 302. Any one or more of the electronic and computing client devices may also transmit information via the directed communication beams 508. Such electronic and computing devices can include printing devices, desktop and portable computing devices such as a personal digital assistant (PDA), cellular phone, and similar mobile communication devices, and any other type of electronic devices configured for wireless communication connectivity throughout building 502, as well as portable devices outside of building 502, such as computing device 510 within region 506. One or more of the electronic and computing client devices may also be connected together via a wired network and/or communication link.

Figure 6:
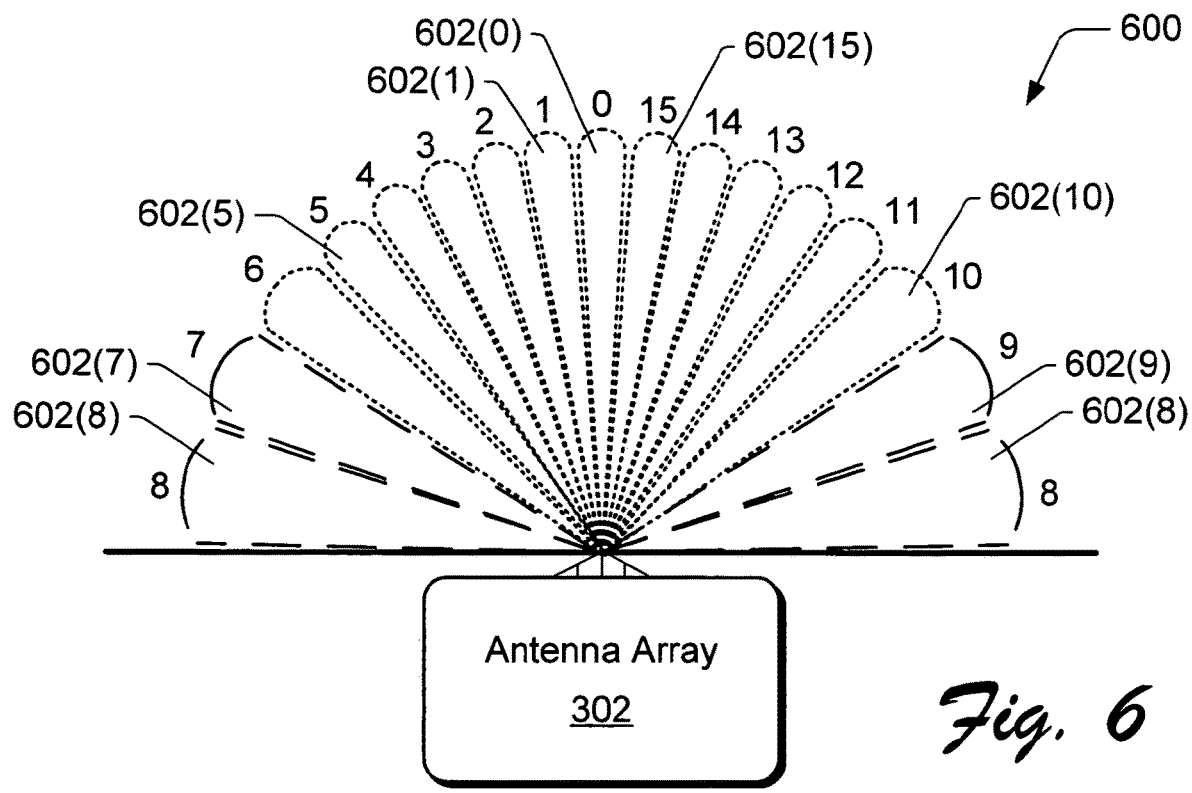
FIG. 6 illustrates an exemplary set of communication beams that emanate from an antenna array of an antenna assembly as shown in FIG. 3.

FIG. 6 illustrates an exemplary set or array of communication beams 600 that emanate from an antenna array 302 as shown in FIGS. 3 and 4. In a described implementation, antenna array 302 can include sixteen antenna elements 400(0, 1, . . . , 14, and 15) (not explicitly shown in FIGS. 4 and 6). From the sixteen antenna elements 400(0-15), sixteen different communication beams 602(0), 602(1), . . . , 602(15) are formed as the wireless communication signals emanating from antenna elements 400(0-15) which may add and/or subtract from each other during electromagnetic propagation.

Communication beams 602(1), 602(15) spread out, or are directed out, symmetrically from a central communication beam 602(0). The narrowest beam is the central beam 602(0), and the beams become wider as they spread outward from the central beam. For example, beam 602(15) adjacent beam 602(0) is slightly wider than beam 602(0), and beam 602(5) is wider than beam 602(15). Also, beam 602(10) is wider still than beam 602(5). The communication beam pattern of the set of communication beams 600 illustrated in FIG. 6 are exemplary only and other communication beam pattern sets may differ in width, shape, number, angular coverage, azimuth, and so forth.

Due to implementation effects of the interactions between and among the wireless signals as they emanate from antenna array 302 (e.g., assuming a linear antenna array in a described implementation), communication beam 602(8) is degenerate such that its beam pattern is formed on both sides of antenna array 302. These implementation effects also account for the increasing widths of the other beams 602(1-7) and 602(15-9) as they spread outward from the central communication beam 602(0). In addition to the implementation effects of the interactions between and among the wireless signals, an obliquity effect explains that an azimuth beamwidth is related to the projected horizontal dimension of the array, as viewed from an oblique angle. Accordingly, the array appears narrower when viewed from an oblique angle, and therefore has a wider beamwidth as compared to a beamwidth viewed from a perpendicular angle. Beamwidth and directivity are inversely proportional and an obliquity factor (i.e., cos(azimuth angle)) defines a reduction in antenna array directivity at oblique angles and thus an increase in beamwidth. In a further implementation, communication beams 602(7) and 602(9) may be too wide for efficient and productive use. Hence, communication beams 602(7), 602(8), and 602(9) are not used and the implementation utilizes the remaining thirteen communication beams 602 (e.g., communication beams 602(0-6) and beams 602(10-15)).

Figure 7:
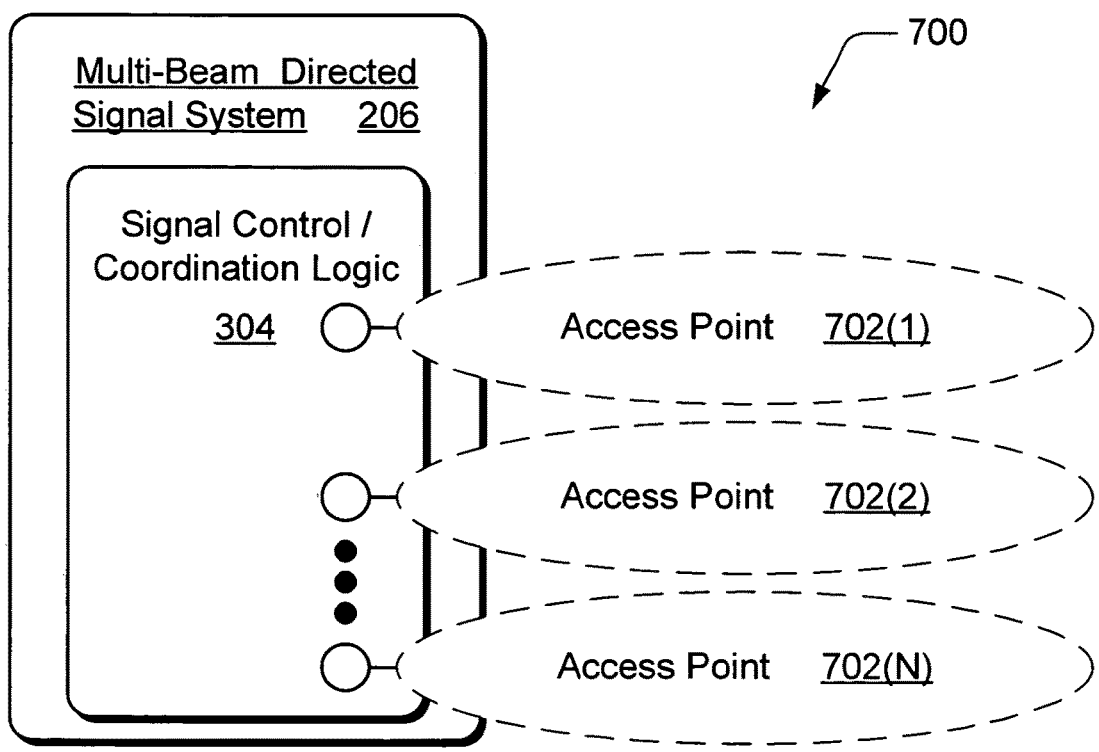
FIG. 7 illustrates an exemplary multi-beam directed signal system that establishes multiple access points.

FIG. 7 illustrates an exemplary implementation 700 of the multi-beam directed signal system 206 which establishes multiple access points 702(1), 702(2), 702(N). The multi-beam directed signal system 206 establishes any number of access points 702 which can each correspond to, for example, an individual access point in accordance with an IEEE 802.11-based standard. Additionally, a wireless coverage area or region for each respective access point 702 may correspond to, for example, a respective directed communication beam 214 as shown in FIGS. 2 and 3, or a respective communication beam 602 as shown in FIG. 6.

Although communication signals directed into (or obtained from) different access points 702 may be directed at particular or specific coverage areas, interference between access points 702 can occur. For example, a downlink signal transmission for access point 702(2) can destroy an uplink signal reception for access point 702(1). Generally, signal control and coordination logic 304 coordinates uplink signal receptions and downlink signal transmissions across (e.g., between and/or among) different access points 702 so as to avoid, or at least reduce, the frequency at which downlink signals are transmitted at a first access point while uplink signals are being received at a second access point.

Specifically, signal control and coordination logic 304 is adapted to monitor the multiple access points 702(1), 702(2), . . . , 702(N) to ascertain when a signal, or communication of information, is being received. When an access point 702 is ascertained to be receiving a signal, the signal control and coordination logic 304 limits (e.g., prevents, delays, etc.) the transmission of signals on the other access points 702 such that signal transmission does not interfere with signal reception. The monitoring, ascertaining, and restraining of signals can be based on and/or responsive to many factors. For example, the signals can be coordinated (e.g., analyzed and controlled) based on a per-channel basis.

Figure 8A:
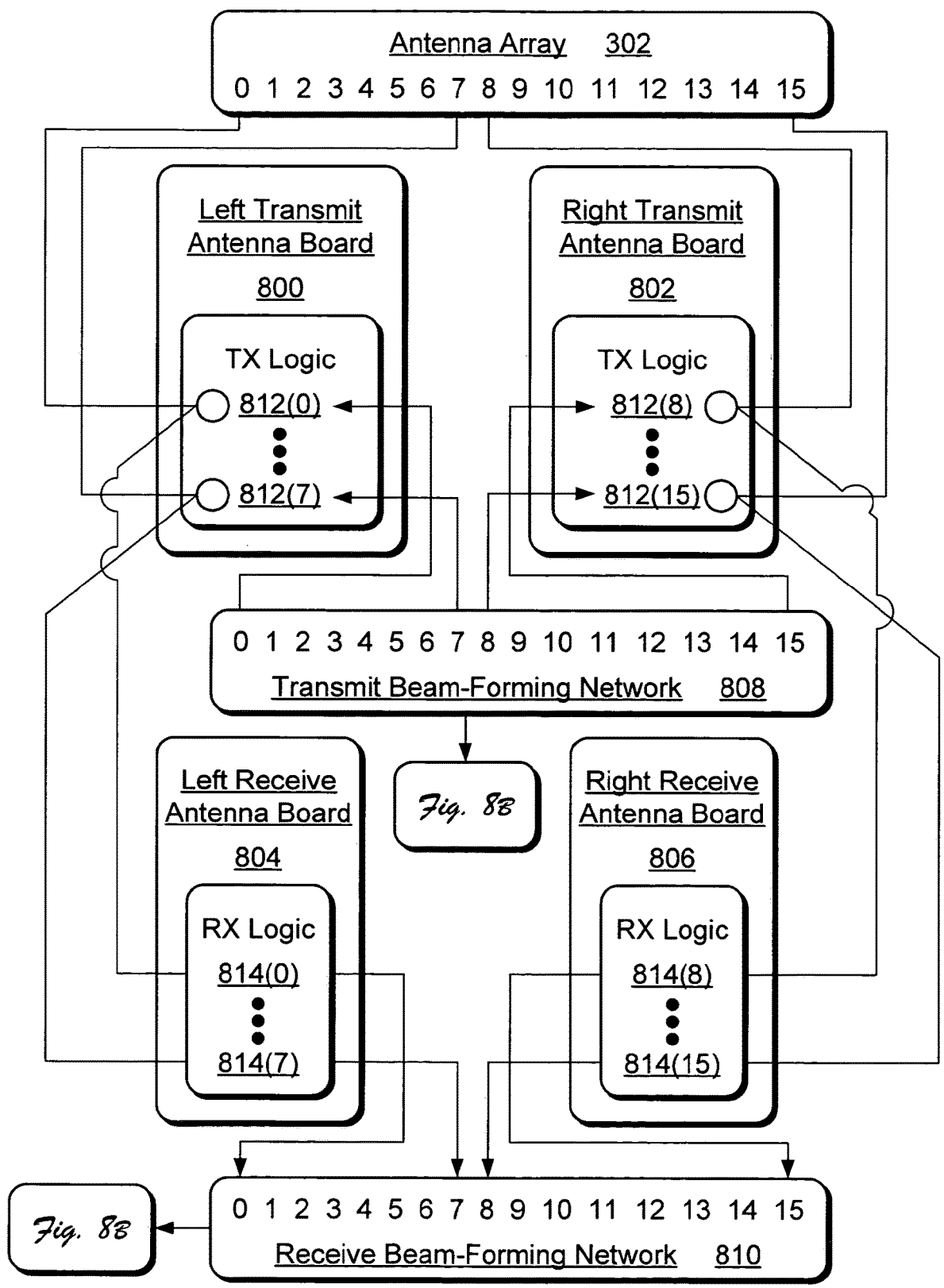
FIGS. 8A and 8B illustrate various components of a multi-beam directed signal system and an antenna assembly of the directed wireless communication system shown in FIG. 2.
Figure 8B:
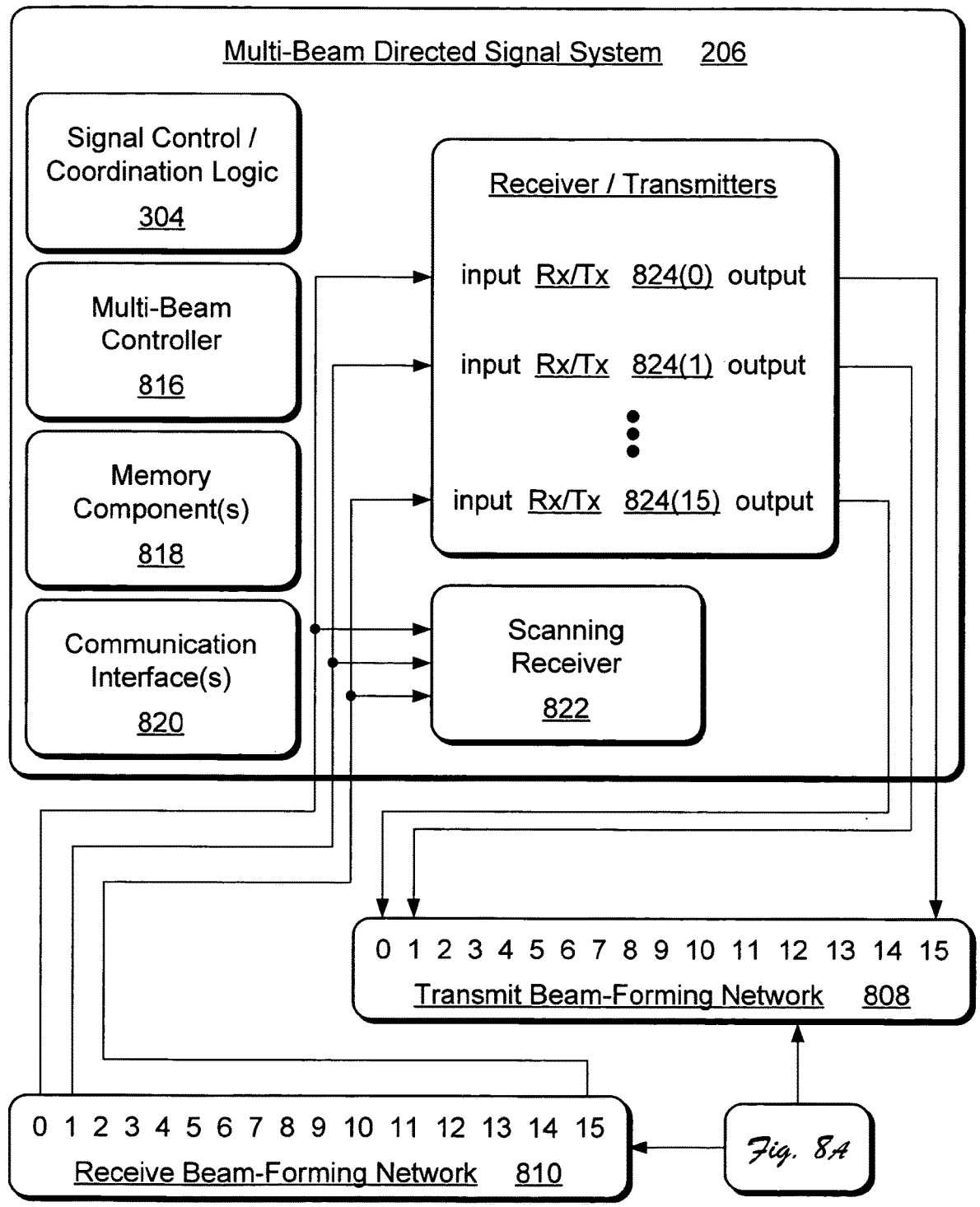

FIGS. 8A and 8B illustrate various components of the multi-beam directed signal system 206 and the antenna assembly 208 both shown in FIGS. 2 and 3. FIG. 8A illustrates antenna array 302 which includes the sixteen antenna elements 400(0, 1, . . . , 15) as described with reference to FIG. 6. The antenna assembly 208 includes RF (radio frequency) components which are shown as a left transmit antenna board 800, a right transmit antenna board 802, a left receive antenna board 804, and a right receive antenna board 806. The multi-beam directed signal system 206 includes a transmit beam-forming network 808 and a receive beam-forming network 810.

The left transmit antenna board 800 includes transmission logic 812(0, 1, 7) and the right transmit antenna board 802 includes transmission logic 812(8, 9, . . . , 15). Each transmission logic 812 (e.g., circuit, component, etc.) corresponds to an antenna element 400(0-15) of the antenna array 302 and corresponds to a signal connection (e.g., node, port, channel, etc.) of the transmit beam-forming network 808(0-15). Similarly, the left receive antenna board 804 includes reception logic 814(0, 1, . . . , 7) and the right receive antenna board 806 includes reception logic 814(8, 9, 15). Each reception logic 814 (e.g., circuit, component, etc.) corresponds to an antenna element 400(0-15) of the antenna array 302 and corresponds to a signal connection (e.g., node, port, channel, etc.) of the receive beam-forming network 810(0-15).

Generally, a beam-forming network 808 and 810 may include multiple ports for connecting to antenna array 302 and multiple ports for connecting to the multiple RF components, such as the transmit and receive antenna boards 800-806. One or more active components (e.g., a power amplifier (PA), a low-noise amplifier (LNA), etc.) may also be coupled to the multiple ports on the antenna array side of a beam-forming network. Thus, antenna array 302 may be directly or indirectly coupled to a beam-forming network 808 and 810.

Specifically, a beam-forming network 808 and 810 may include at least "N" ports for each of the multiple RF transmission and receive logic components 812 and 814, respectively. For example, each directed communication beam 214 (FIG. 2) or 602 (FIG. 6) emanating from antenna array 302 corresponds to an RF logic component 812 and/or 814. Each RF logic component 812 and 814 can be implemented as, for example, a transmit and/or receive signal processor operating at one or more radio frequencies, with each frequency corresponding to a different channel. It should be noted that channels may be defined alternatively (and/or additionally) using a mechanism other than frequency, such as a code, a time slot, some combination thereof, and so forth.

FIG. 8B further illustrates various components of the multi-beam directed signal system 206 which includes the signal control and coordination logic 304, a multi-beam controller 816, one or more memory components 818, communication interface(s) 820, a scanning receiver 822, and receiver/transmitters (Rx/Tx) 824(0, 1, . . . , 15). The multi-beam controller 816 (e.g., any of a processor, controller, logic, circuitry, etc.) can be implemented to control channel assignments for communication signals and data communication coordinated by the signal control and coordination logic 304.

The channel assignments coordinated by the signal control and coordination logic 304 provide the best channel assignment for a signal based on given measurement information. Parameters of a channel assignment algorithm include:

ChannelAssignmentCycle which identifies a duration between changes in the channel assignment;

HeavyInterference which identifies an interference activity threshold. If, for example, interference activity is determined to be above this value, a particular channel may be considered deficient for the duration of time that the interference can be detected;

BadChannelThreshold which identifies a number of measurement periods (e.g., a MeasurementDuration) that a channel has interference activity above the HeavyInterference threshold; and JamInterference which identifies an interference activity threshold above the HeavyInterference parameter.

Further, channel assignment internal parameters can include:

MeasurementCycle which identifies a time duration (e.g., twenty-four hours) in which a measurement is completed;

MeasurementDuration which identifies a time duration (e.g., minutes) between two measurement points;

PeakLoadLimit which identifies a maximum load allowed on one channel; and

ChannelSixBiasFactor which is a bias factor to compensate for transmission on channel six to reduce inter-modulation.

The scanning receiver 822 and the receiver/transmitters (Rx/Tx) 824 measure metrics of channel activity every specified MeasurementDuration during a cycle of MeasurementCycle. The metrics can include a number of associated client devices, throughput and packet error rates (PER) of each receiver/transmitter 824, interference and channel utilization of each communication beam (e.g., frequency, or channel), and/or any number of other metrics. The channel activity metrics include:

$N_i(t)$ which is a number of associated clients of the ith Rx/Tx 824 and which is averaged over the MeasurementDuration period;

$S_i(t)$ which is the throughput of the ith Rx/Tx 824 measured in packets/second or bytes/second, and which is averaged over the MeasurementDuration period;

$P_i(t)$ which is a packet error rate (PER) of the ith Rx/Tx 824 and which is averaged over the MeasurementDuration period;

$D_i(t)$ which is a delay of the ith Rx/Tx 824 and which is averaged over the MeasurementDuration period;

$\rho_{ij}(t)$ which is channel utilization of the ith beam on the jth channel and which is measured by both the Rx/Tx 824 and scanning receiver 822 and averaged over the MeasurementDuration period. This is also referred to as a Channel Utilization Factor (CUF);

$Ns_j(t)$ which is a number of downlink data packets transmitted on the jth channel and which is averaged over the MeasurementDuration period;

$Nr_{ij}(t)$ which is a number of correctly received uplink data packets transmitted by client devices associated with the ith beam on the jth channel, and which is averaged over the MeasurementDuration period;

$Nn_{ij}(t)$ which is a number of uplink data packets transmitted by client devices associated with other communication beams, and which are correctly received by the ith beam on the jth channel. This is measured by the scanning receiver 822 and is averaged over the MeasurementDuration period. This is also referred to as the Self Interference Metric (SIM);

$No_{ij}(t)$ which is a number of uplink data packets transmitted by the client devices from overlapping subnets and which are correctly received by the ith beam on the jth channel. This is measured by the scanning receiver 822 and is averaged over the MeasurementDuration period. This is also referred to as the Overlapping Subnet Interference (OSI);

$Ne_{ij}(t)$ which is a number of uplink data packets with Physical Layer Convergence Procedure (PLCP) or data Cyclic Redundancy Check (CRC) errors in the ith beam on the jth channel and which is measured by the scanning receiver 822 and averaged over the MeasurementDuration period. This is also referred to as the Unidentified Interference Metric (UIM); and $I_{ij}(t)$ which is the interference of the ith beam on the jth channel and which is measured by the scanning receiver 822.

These and other metrics can be maintained with a memory component 818 in a data table (or similar data construct) within the MeasurementCycle. When the cycle restarts, the data table can either be cleared or updated with some aging factor to identify past metrics.

The metric $I_{ij}(t)$ can be derived from other measurements when the receiver/transmitters 824 are on the same channel. In such cases, $I_{ij}(t)$ can be estimated by first estimating a total number of packets from any overlapping subnets by an equation:

$$NI_{ij}(t) = No_{ij}(t) + Ne_{ij}(t) \cdot \frac{No_{ij}(t)}{Nr_{ij}(t) + Nn_{ij}(t) + No_{ij}(t)}$$

Further, $I_{ij}(t)$ may be estimated by:

$$I_{ij}(t) = \frac{NI_{ij}(t)}{NS_i(t) + Nr_{ij}(t) + Nn_{ij}(t) + No_{ij}(t) + Ne_{ij}(t)} \cdot \rho_{ij}(t)$$

For channel assignment pre-processing, a channel that has interference activity which exceeds HeavyInterference for a BadChannelThreshold is not used. The interference activity is averaged over intervals of the MeasurementDuration period. In an implementation, a MeasurementCycle can include forty-eight measurement intervals. A channel can be eliminated if the interference activity HeavyInterference exceeds the BadChannelThreshold for a specified number of periods.

The total number of active users (e.g., client devices) associated with any one directed communication beam 214 (FIG. 2) or 602 (FIG. 6) can be estimated by dividing the number of associated users of that communication beam by the percentage of time available to those users. The total number of users on beam i and channel j may therefore be described by:

$$N_{ij}(t) = \frac{N_i(t)}{1 - \tilde{I}_{ij}(t)}$$

where $\tilde{I}_{ij}(t)=\min\{I_{ij}(t), \text{HeavyInterference}\}$ which is the interference activity limited to a maximum allowable interference on a given communication beam. This ensures that the estimate does not provide large peaks due to an unusual period of high interference.

Figure 14:
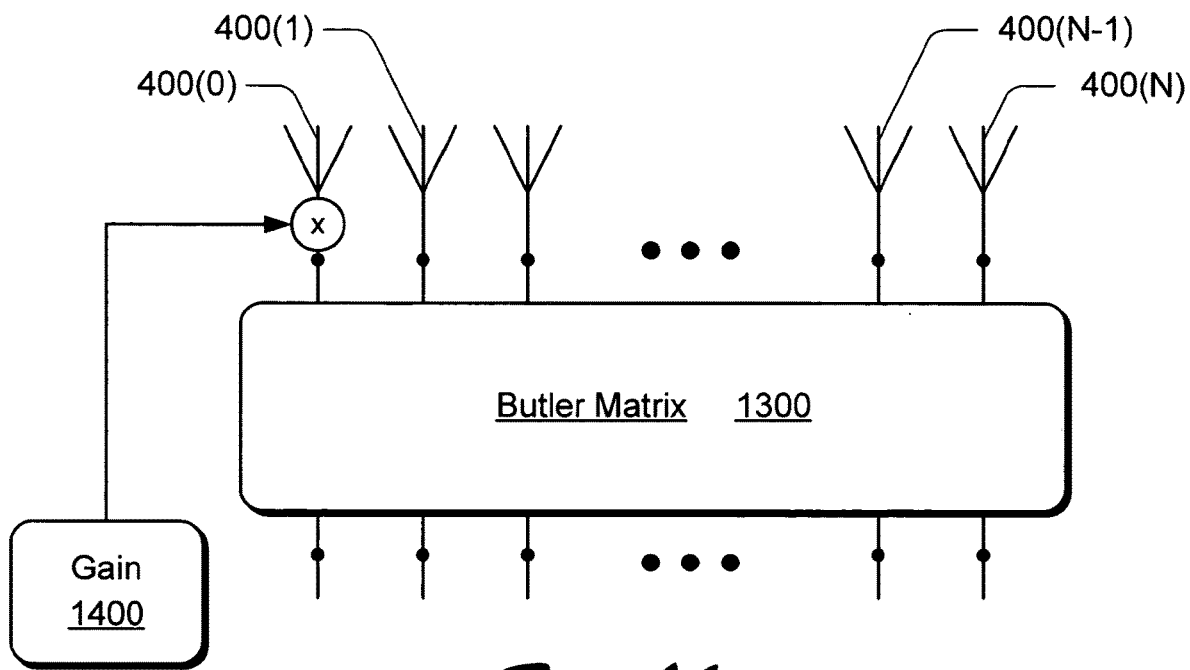
FIG. 14 further illustrates a component implementation of the multi-beam directed signal system for complementary beam-forming.

A block-based channel assignment algorithm assigns adjacent communication beams to the same frequency channel which minimizes the hidden beam problem as described further with reference to FIG. 14. The algorithm allocates the thirteen communication beams into a maximum of three blocks, with each block assigned to one frequency channel (e.g., channels 1, 6, or 11) so that the peak load on each channel is minimized. To determine an optimal solution, the boundaries between the assignment blocks (i.e. the number of communication beams in each block) and the frequency channel of each block is determined.

There are sixty-six possible combinations that divide thirteen communication beams into three blocks. For each of these possible combinations, the three blocks would be assigned to the three different channels. The number of channel permutations is six and the best channel-beam combination from three hundred, ninety-six (66×6=396) possible combinations can be determined. A factor $L_j(t)$ is denoted as the total load on the jth frequency channel at time (t) such that. $L_j^*=\max\{L_j(t)\}$ where t is of the set [0,T] which is the peak load on the jth channel in the last measurement period, and where T is the measurement cycle (i.e., MeasurementCycle). A combination can be determined that minimizes the peak load on all of the channels which can be described as $\min\{\max\{L_j^*\}\}$ where j is of the set $[f_1f_6f_{11}]$.

In an event that the overall network communication load, or traffic, is minimal, fewer than the three frequency channels may be used. A parameter PeakLoadLimit identifies a communication load limit below which only two of the frequency channels (e.g., channel 1 and channel 11, for example) are used. If the peak communication load on either of the two channels exceeds the PeakLoadLimit, then the three frequency channels can be utilized.

The block-based channel assignment algorithm can be implemented to utilize two or three frequency channels. Initially, the thirteen communication beams are divided into two blocks of which there are twelve possible combinations. For each combination, the channel selections can be $f_1f_6$, $f_1f_{11}$, $f_6f_1$, $f_6f_{11}$, $f_{11}f_1$, or $f_{11}f_6$ such that there are a total of seventy-two block and channel combinations. Assuming that the kth block-channel combination has a configuration as follows:

Block 1: communication beams 0 to $b_k$ (0 to N−2) are assigned to channel $C_1$; and Block 2: communication beams $b_k+1$ to N−1 (1 to N−1) are assigned to channel $C_2$ Then the communication traffic load of channels $C_1$ and $C_2$ are:

$$L_{C1}^{ki}(t) = \sum_{i=0}^{b_k} N_{iC1}(t)$$

$$L_{C2}^{k}(t) = \sum_{i=b_k+1}^{N-1} N_{iC2}(t)$$

The peak communication load on the first block for combination k is denoted by:

$PL_1(k)=\max\{L^k{}_{C1}(t)\}$ where t is of the set [0,T]

$PL_2(k)=\max\{L^k{}_{C2}(t)\}$ where t is of the set [0,T]

And the peak communication load for the busiest block (e.g., channel) is:

$PL_{max}(k)=\max\{PL_1(k),PL_2(k)\}$

A combination index R with the least peak communication load is then selected such that $PL_{max}(R)=\min\{PL_{max}(k)\}$ where (0≤k≤71) which is the combination of channels and beams that minimize the peak load on any channel. If the peak load on a channel is not less than the PeakLoadLimit, then a three channel assignment can be implemented. Initially, the thirteen communication beams are divided into three blocks of which there are sixty-six possible combinations. For each combination, the channel selections can be $f_1f_6f_{11}$, $f_1f_{11}f_6$, $f_6f_1f_{11}$, $f_6f_{11}f_1$, $f_{11}f_1f_6$, or $f_{11}f_6f_1$ such that there are a total of three-hundred, ninety-six block and channel combinations. Assuming that the kth block-channel combination has a configuration as follows:

Block 1: communication beams 0 to $b_k$ (0 to N−3) are assigned to channel $C_1$; and Block 2: communication beams $b_k+1$ to $p_k$ (1 to N−2) are assigned to channel $C_2$; and Block 3: communication beams $p_k+1$ to N−1 (2 to N−1) are assigned to channel $C_3$;

Then the communication traffic load of channels $C_1$, $C_2$, and $C_3$ are:

$$L_{C1}^{ki}(t) = \sum_{i=0}^{b_k} N_{iC1}(t)$$

$$L_{C2}^{k}(t) = \sum_{i=b_k+1}^{p_k} N_{iC2}(t)$$

$$L_{C3}^{k} = \sum_{i=p_k+1}^{N-1} N_{iC3}(t)$$

The peak communication load on the first block for combination k is denoted by:

$PL_1(k)=\max\{L^k{}_{C1}(t)\}$ where t is of the set [0,T]

$PL_1(k)=\max\{L^k{}_{C2}(t)\}$ where t is of the set [0,T]

$PL_3(k)=\max\{L^k{}_{C3}(t)\}$ where t is of the set [0,T], and the peak communication load for the busiest block (e.g., channel) is:

$PL_{max}(k)=\max\{PL_1(k),PL_2(k),PL_3(k)\}$

A combination index R with the least peak communication load is then selected such that $PL_{max}(R)=\min\{PL_{max}(k)\}$ where ($0\le k\le 395$) which is the combination of channels and beams that minimize the peak load on any channel.

When taking into account intermodulation such that channel combinations $f_1f_6$ and $f_6f_{11}$ are to be avoided, then $f_6$ is avoided. Initially, the thirteen communication beams are divided into two blocks of which there are twelve possible combinations. For each combination, the channel selections can be $f_1f_{11}$ and $f_{11}f_1$ such that there are a total of twenty-four block and channel combinations. Assuming that the kth block-channel combination has a configuration as follows:

Block 1: communication beams 0 to $b_k$ (0 to N−2) are assigned to channel $C_1$; and Block 2: communication beams $b_k+1$ to N−1 (1 to N−1) are assigned to channel $C_2$ Then the communication traffic load of channels $f_1$ and $f_{11}$ is the sum of the loads of the communication beams assigned to those channels as follows:

$$L^k_{f1}(t) = \sum_{f_1} N_{if1}(t) \quad \forall\, (i \in f_1)$$

$$L^k_{f11}(t) = \sum_{f_{11}} N_{if11}(t) \quad \forall\, (i \in f_{11})$$

The peak communication load on the first block for combination k is denoted by:

$PL_1(k)=\max\{L^k_{f1}(t)\}$ where $t$ is of the set $[0,T]$ $PL_2(k)=\max\{L^k_{f11}(t)\}$ where $t$ is of the set $[0,T]$ and the peak communication load for the busiest block (e.g., channel) is:

$PL_{max}=\max\{PL_1(k), PL_2(k)\}$

A combination index R with the least peak communication load is then selected such that $PL_{max}(R)=\min\{PL_{max}(k)\}$ where ($0\le k\le 71$) which is the combination of channels and beams that minimize the peak load on any channel. If the peak load on a channel is not less than the PeakLoadLimit, then a three channel assignment can be implemented.

Memory component(s) 818 can maintain routing and signal information which can include transmit power level information, transmit data rate information, antenna pointing direction information, weighting information, constraints information, null/zero location information, peak location information, quality of service (QoS) information, priority information, lifetime information, frequency information, timing information, user and node authentication information, keep out area information, etc., that is associated with each sending and receiving communication channel of the wireless communication system and within the multi-beam directed signal system 206. In an implementation, at least some of routing information can be maintained with memory component(s) 818 within one or more routing tables or similar data structure(s).

The routing table(s) or similar data structure(s) provide an information basis for each routing decision within the wireless communication system (e.g., multi-beam directed signal system 206). By way of example, routing table(s) entries may include all or part of the following information: IP address (e.g., IPv6) of a node in the wireless network—e.g., as an index; 48-bit unique address—e.g., IEEE 802.1 MAC address; Protocol ID—e.g., IEEE 802.11, 802.16.1, etc.; Modulation method; Connection ID (CID) of a node—e.g., as used in an IEEE 802.16.1 MAC; Nominal direction to a node—e.g., one or two dimension; Nominal transmit power level to a node; Nominal received signal strength indicator (RSSI) level from a node; Nominal channel to transmit on, and perhaps a backup channel; Nominal channel to receive on, and perhaps a backup channel; Nominal transmission data rate, e.g., 6 Mbps-54 Mbps, or as available; Nominal receive data rate, e.g., 6 Mbps-54 Mbps, or as available; Known station interference nulls; and Unknown station interference nulls.

In an exemplary implementation, and within the structure of signal control/coordination logic 304, the routing table(s) are configured to receive or include data and/or primitives (e.g., function calls) from an Internet Protocol (IP) layer and a medium access control (MAC) layer, and to instruct a physical (PHY) layer to provide media access through the MAC layer. Therefore, in some examples, a routing table is more than simply a data table (or other similar structure) since it may also perform or otherwise support controlling and/or scheduling functions.

The communication interface(s) 820 can be implemented as any one of a serial, parallel, network, or wireless interface that communicatively couples the multi-beam directed signal system 206 with other electronic and/or computing devices. For example, the multi-beam directed signal system 206 can be coupled with a wired connection (e.g., an input/output cable) via a communication interface 820 to a network switch that communicates digital information corresponding to a communication signal to a server computing device. Any of the communication interfaces 820 can also be implemented as an input/output connector to couple digital, universal serial bus (USB), local area network (LAN), wide area network (WAN), metropolitan area network (MAN), and similar types of information and communication connections.

The scanning receiver 822 scans each directed communication beam (e.g., directed communication beams 214 shown in FIGS. 2 and 3) consecutively and monitors for client devices and associated information such as the transmit power of a client device, roaming status, and the many other communication factors to update data that is maintained about each client device that is in communication via a communication beam. In an implementation, the scanning receiver 822 can be described in two operating states: a scan mode and a roaming mode. While operating in the scan mode, the scanning receiver 822 periodically scans the thirteen communication beams on the three channels and collects activity information to be maintained with the client device data.

Figure 9:
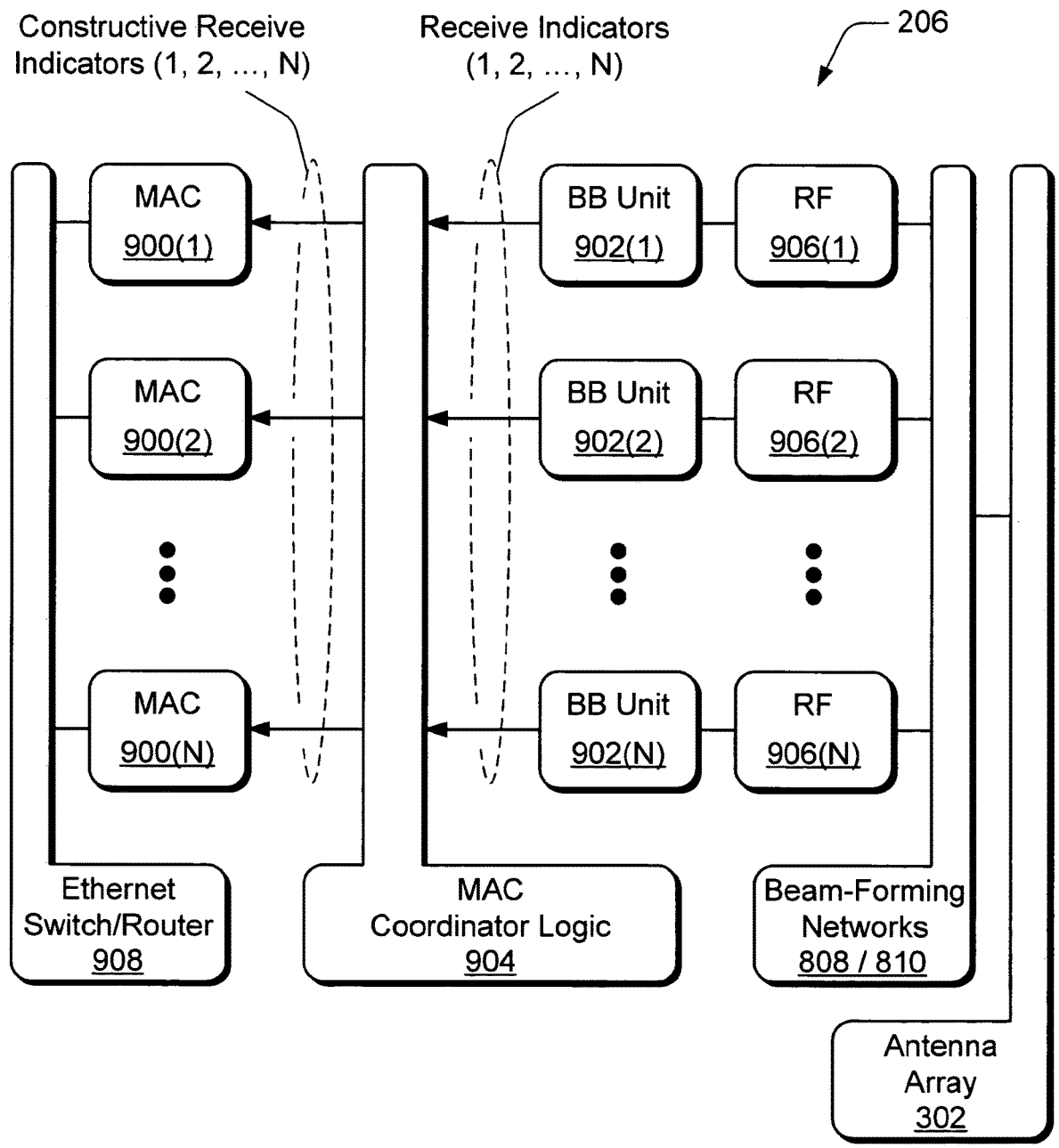
FIG. 9 illustrates an exemplary multi-beam directed signal system that includes various components such as medium access controllers (MACs), baseband units, and MAC coordinator logic.

FIG. 9 illustrates an exemplary multi-beam directed signal system 206 that includes various components such as medium access controllers (MACs) 900, baseband units (BB) 902, and MAC coordinator logic 904. The multi-beam directed signal system 206 also includes radio frequency (RF) components 906 such as the left and right transmit antenna boards 800 and 802 (shown in FIG. 8), respectively, and the left and right receive antenna boards 804 and 806, respectively. This example also illustrates the antenna array 302, the transmit beam-forming network 808 and the receive beam-forming network 810, and an Ethernet switch and/or router 908.

As described in the implementation with reference to FIG. 8, antenna array 302 (e.g., via antenna assembly 208) is coupled to the beam-forming networks 808 (transmit) and 810 (receive). The beam-forming networks 808 and 810 are coupled to multiple RF components 906(1), 906(2), . . . , 906(N). Respective RF components 906(1), 906(2), . . . , 906(N) are each coupled to a respective baseband unit 902(1), 902(2), ..., 902(N) which are coupled to MAC coordinator logic 904. The Ethernet switch/router 908 is coupled to the multiple MACs 900(1), 900(2), ..., 900(N) which are also each coupled to MAC coordinator logic 904.

In operation generally, each MAC 900 is associated with a respective baseband unit 902. Although not specifically shown in FIG. 9, each respective MAC 900 may also be communicatively coupled to a corresponding baseband unit 902. MAC coordinator logic 904 is configured to coordinate the activities of the multiple MACs 900 with regard to at least one non-associated respective baseband unit 902. For example, MAC coordinator logic 904 may forward an instruction to MAC 900(1) responsive, at least partly, to an indicator provided from baseband unit 902(2). MAC coordinator logic 904 can be implemented as hardware, software, firmware, and/or some combination thereof.

The Ethernet switch/router 908 is coupled to Ethernet backbone 212 (FIG. 2) and is configured to relay incoming packets from Ethernet backbone 212 to the appropriate MAC 900 to which they correspond. Ethernet switch/router 908 is also configured to relay outgoing packets from the multiple MACs 900 to Ethernet backbone 212. Ethernet switch/router 908 may be implemented using, for example, a general purpose central processing unit (CPU) and memory. The CPU and memory can handle layer-2 Internet protocol (IP) responsibilities, flow control, and so forth. When receiving packets from Ethernet backbone 212, Ethernet switch/router 908 obtains the destination port for the destination MAC 900 address. In this manner, an Ethernet switch and/or router may be realized using software (or hardware, firmware, some combination thereof, etc.).

The beam-forming networks 808 and 810, in conjunction with antenna array 302, form the multiple directed communication beams 214 (FIGS. 2 and 3), A beam-forming network can be implemented as an active or passive beam-former. Examples of such active and passive beam-formers include a tuned vector modulator (multiplier), a Butler matrix, a Rotman lens, a canonical beam-former, a lumped-element beam-former with static or variable inductors and capacitors, and so forth. Alternatively, communication beams may be formed using full adaptive beam-forming.

As described with reference to FIGS. 8A and 8B, a beam-forming network 808 and 810 may include multiple ports for connecting to antenna array 302 and additional ports for connecting to the multiple RF components 906. One or more active components (e.g., a power amplifier (PA), a low-noise amplifier (LNA), etc.) may also be coupled to the multiple ports on the antenna array side of the beam-forming networks 808 and 810. Thus, antenna array 302 may be directly or indirectly coupled to the beam-forming networks 808 and 810.

The beam-forming networks 808 and 810 may include at least "N" parts for each of the multiple RF components 906(1, 2, ..., N). In an example implementation, each communication beam 214 emanating from antenna array 302 corresponds to an RF component 906. Each RF component 906 can be implemented as a transmit and/or receive signal processor operating at radio frequencies and each RF component 906 can operate at one or more frequencies, with each frequency corresponding to a different channel. It should be noted that channels may be defined alternatively (and/or additionally) using a mechanism other than frequency, such as a code, a time slot, a signal node, some combination thereof, and so forth.

As described above, each respective RF component 906 (1, 2, ..., N) is coupled to a respective baseband unit 902(1, 2, N) and each respective MAC 900(1, 2, ..., N) is associated with a corresponding baseband unit 902(1, 2, ..., N). Although not illustrated in this example or required, each MAC 900 and associated respective baseband unit 902 may be located on individual respective electronic cards. Additionally, the respective RF component 906 to which each respective baseband unit 902 is coupled may also be located on the individual respective electronic cards.

Each respective MAC 900 and corresponding baseband unit 902 may be associated with a different respective access point, such as access points 702(1, 2, ..., N) (FIG. 7). Each respective RF component 906, along with signal nodes (e.g., ports, communication nodes, etc.) of the beam-forming networks 808 and 810, and/or antenna array 302, and respective communication beams 214 may also correspond to the different respective access points 702. The MACs 900 are configured to control access to the media that is provided, at least partially, by baseband units 902. In this case, the media corresponds to the signals transmitted and/or received via communication beams 214 (FIGS. 2 and 3). These signals can be analog, digital, and so forth. In a described implementation, digital signals comprise one or more data packets.

In a packet-based environment, a data packet arriving at the multi-beam directed signal system 206 (or at access station 102) via a particular communication beam 214 from a particular remote client device 202 (FIG. 2) is received via the antenna array 302 and the beam-forming networks 808 and/or 810. The data packet is processed through a particular RF component 906 and a corresponding baseband unit 902. The data packet is then forwarded from baseband unit 902 to a corresponding MAC 900 which facilitates data packet communication via the Ethernet backbone 212 (FIG. 2) by Ethernet switch/router 908. Data packets arriving at the multi-beam directed signal system 206 (or at access station 102) via Ethernet switch/router 908 are transmitted to a remote client device 202 and/or 204 via directed communication beam(s) 214 in an opposite communication path. The transmission and reception of data packets via directed communication beams 214, as well as the forwarding of packets within the multi-beam directed signal system 206 is controlled at least partially by the MACs 900.

In a typical MAC-baseband environment, a MAC controls the associated baseband circuitry using input solely from the associated baseband circuitry. For example, if baseband circuitry indicates to its associated MAC that it is receiving a packet, then the associated MAC does not initiate the baseband circuitry to transmit a packet, which can jeopardize the integrity of the packet being received.

With co-located access points 702 (e.g., as in FIG. 7) and/or co-located pairs of MACs 900 and associated baseband units 902, a first access point 702(1) and/or a first MAC 900(1)/baseband unit 902(1) pair are unaware of the condition or state (e.g., transmitting, receiving, idle, etc.) of a second access point 702(2) and/or a second MAC 900(2)/baseband unit 902(2) pair, and vice versa. As a result, absent additional control and/or logic, a data packet being received by the first access point 702(1) and/or the first MAC 900(1)/baseband unit 902(1) pair can be corrupted (e.g., altered, destroyed, interfered with, rendered unusable for its intended purpose, etc.) by a transmission from the second access point 702(2) and/or the second MAC 900(2)/baseband unit 902(2) pair. This corruption may occur even though the packet reception and the packet transmission are effectuated using different communication beams 214(3) and 214(2), respectively, when the reception and transmission occur on the same channel. Effectively, an incoming data packet reception via a first communication beam 214 can be rendered unsuccessful by an outgoing data packet transmission via a second communication beam 214 that occurs on the same channel and is overlapping.

As described above, MAC coordinator logic 904 is coupled to the multiple baseband units 902(1, 2, ..., N) and to the multiple MACs 900(1, 2, ..., N). The MAC coordinator logic 904 is configured to prevent MACs 900(1, 2, ..., N) from generating or otherwise causing a transmission if at least one and optionally if any of the baseband units 902(1, 2, ..., N) are receiving. For example, if baseband unit 902(2) indicates that it is receiving a data packet, MAC coordinator logic 904 initiates that MACs 900(1, 2, ..., N) refrain from generating or otherwise causing a data packet transmission during the data packet reception. Factors that can modify, tune, tweak, extend, etc. this data packet transmission restraint may include one or more of the MACs 900 enabling transmissions on different channel(s) from that of baseband unit 902(2) which is receiving.

More specifically, each baseband unit 902 forwards a corresponding receive indicator to MAC coordinator logic 904 which monitors the baseband units 902. The MAC coordinator logic 904 analyzes the receive indicators to generate constructive receive indicators that are communicated, or otherwise provided, to each of the MACs 900. In a described implementation, each baseband unit 902 forwards a receive indicator that reflects whether and/or when a baseband unit 902 is currently receiving a signal. Optionally, not physically forwarding an indicator may constitute a receive indicator that reflects no signal is being received. After processing the different receive indicators, MAC coordinator logic 904 forwards the same constructive receive indicator to each MAC 900 based on multiple, and possibly all, receive indicators. The MAC coordinator logic 904 may provide different constructive receive indicators to at least different subsets of the MACs 900.

The receive indicators forwarded to MAC coordinator logic 904 may be comprised of any one or more different indications from the baseband units 902. For example, the receive indicators may comprise clear channel assessment (CCA) or busy/non-busy indications. Alternatively, the receive indicators may comprise indications of signal reception based on energy signals, cross-correlation signals, data signals, other transmit and/or control signals, some combination thereof, and so forth. Furthermore, a receive indicator may comprise an analog or digital indication (of one or more bits), the driving of one or more lines, the presentation of one or more messages, some combination thereof, and so forth.

The MAC coordinator logic 904 is configured to accept the receive indicators from the baseband units 902 and combine them in some manner to generate or otherwise produce the constructive receive indicator(s). For example, MAC coordinator logic 904 may "OR" the receive indicators together to generate the constructive receive indicator (s). Consequently, if any receive indicator from baseband units 902 indicates that a baseband unit is receiving a signal, then, the constructive receive indicator indicates to each MAC 900 that a reception is occurring on a directed communication beam 214 (and/or access point 702) of the multi-beam directed signal system 206. As a result, the MACs 900 that are provided with an affirmative constructive receive indicator do not cause their respective associated baseband units 902 to transmit.

The constructive receive indicators provided from MAC coordinator logic 904 may be comprised of any one or more different indications interpretable by the MACs 900. For example, the constructive receive indicators may comprise an indication for one or more predetermined inputs, such as a CCA or busy/non-busy input of the MACs 900. Alternatively, the constructive receive indicators may be input to a different type of do-not-transmit input, a specially-designed input, a message-capable input, some combination thereof, and so forth. Furthermore, a constructive receive indicator may comprise an analog or digital indication (of one or more bits), the driving of one or more lines, the presentation of one or more messages, some combination thereof, and the like.

Figure 10:
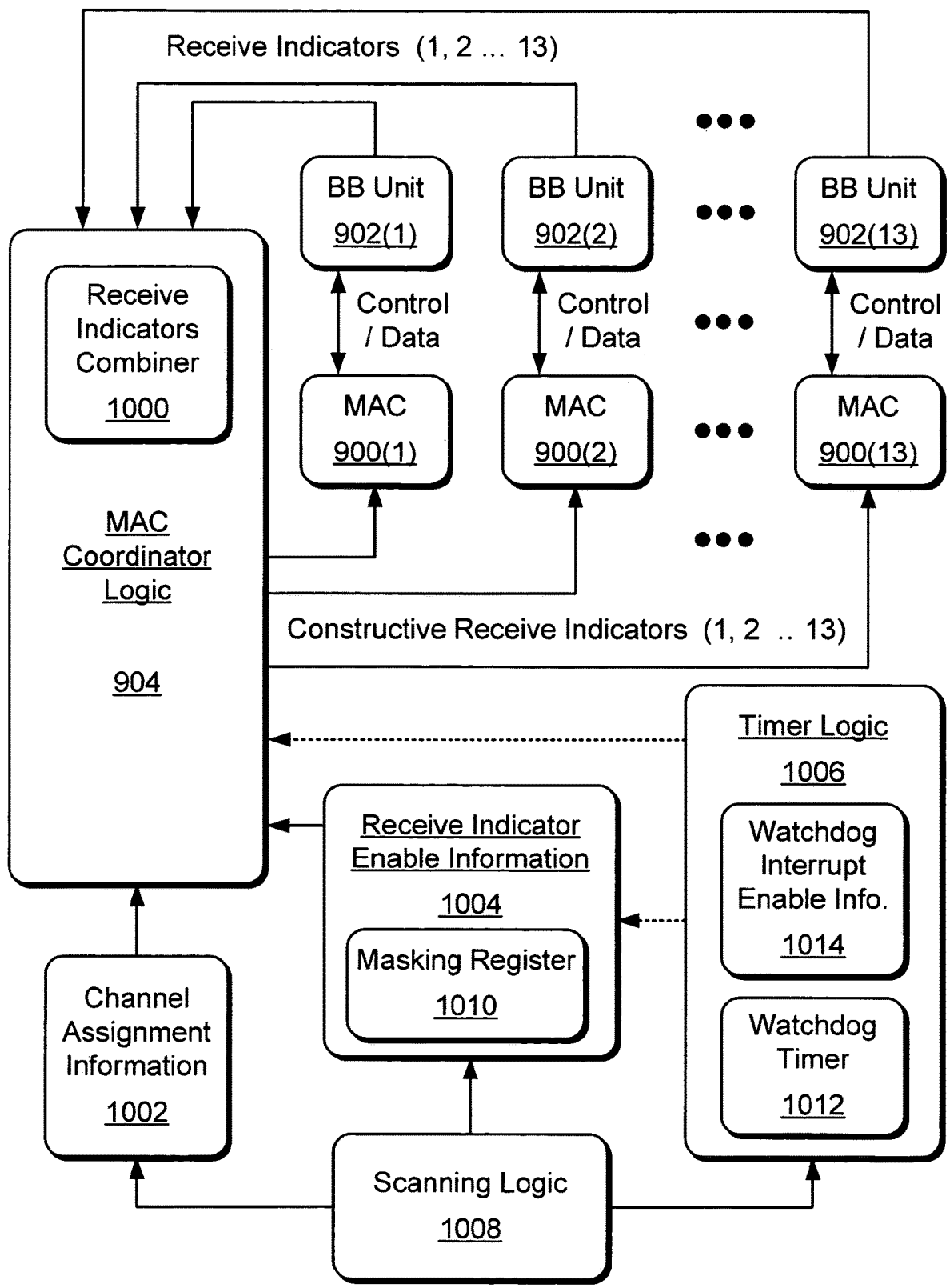
FIG. 10 further illustrates various components of the exemplary multi-beam directed signal system shown in FIG. 9.

FIG. 10 further illustrates various components of the multi-beam directed signal system 206 shown in FIG. 9 which includes the MACs 900, baseband units 902, and MAC coordinator logic 904. In this example, the exemplary multi-beam directed signal system 206 includes thirteen MACs 900(1, 2, ..., 13) and thirteen baseband units 902(1, 2, ..., 13) that are associated respectively therewith. Thirteen baseband units 902(1, 2, ..., 13) and thirteen MACs 900(1, 2, ..., 13) are utilized in this exemplary multi-beam directed signal system 206 to comport with the efficiently usable communication beams 602(0-6) and 602 (10-15) of the exemplary set of communication beams shown in FIG. 6. However, the elements and features described with reference to FIG. 10 are applicable to multi-beam directed signal systems 206 and/or access stations 102 with more than or fewer than thirteen MACs 900 and associated baseband units 902.

The baseband units 902(1, 2, ..., 13) are configured to communicate with MACs 900(1, 2, ..., 13), and vice versa, directly or indirectly without MAC coordinator logic 904 input. Specifically, control data may be transferred there between which may include, for example, data packets for wireless communication on communication beams 214 (FIGS. 2 and 3), carrier sense multiple access/collision avoidance (CSMA/CA) type information, and so forth. The media access technique in 802.11 is based on a Carrier Sense Multiple Access (CSMA) operation in which a each station transmits only when it determines that no other station is currently transmitting. This tends to avoid collisions that occur when two or more stations transmit at the same time where a collision would typically require that a transmitted packet be retransmitted.

In this example, the baseband units 902(1, 2, ..., 13) forward receive indicators (1, 2, ..., 13) to MAC coordinator logic 904. The MAC coordinator logic 904 includes a receive indicators combiner 1000 which may be comprised of one or more of program coding, a field-programmable gate array, discrete logic gates, and so forth, and which may be implemented as hardware, software, firmware, and/or some combination thereof. Receive indicators combiner 1000 combines receive indicators (1, 2, ..., 13) to generate constructive receive indicators (1, 2, ..., 13). For example, receive indicators (1, 2, ..., 13) may be combined using a logical "OR" functionality which ensures that if any one or more receive indicators of receive indicators (1, 2, ..., 13) is indicating that a signal is being received, then the associated constructive receive indicators of constructive receive indicators (1, 2, ..., 13) also indicate that a signal is being received.

The constructive receive indicators (1, 2, ... 13) are provided or otherwise communicated to MACs 900(1, 2, ... 13), respectively, so that. MACs 900(1, 2, ..., 13) do not cause baseband units 902(1, 2, ..., 13) to transmit a signal while another signal is being received. The baseband units 902(1, 2, ..., 13) and the MACs 900(1, 2, ..., 13) may be segmented or grouped by a characteristic and/or state, such as by wireless communication channels. When segmented or grouped, a constructive receive indicator of a given segment or group indicates to a MAC that a signal is being received and that no signal should therefore be transmitted when any receive indicator of that given segment or group indicates that a signal is being received (or when multiple receive indicators of that given segment or group indicate that multiple signals are being received).

The MAC coordinator logic 904 can be modified, adjusted, expanded, etc. based on any number of different factors that include channel assignment information 1002, receive indicator enable information 1004, timer logic 1006, and scanning logic 1008. Although illustrated as separate components, any one or combination of the channel assignment information 1002, receive indicator enable information 1004, timer logic 1006, and/or scanning logic 1008 can be implemented together and/or as part of MAC coordinator logic 904 or as another component of a multi-beam directed signal system 206.

Channel assignment information 1002 enables receive indicators (1, 2, ..., 13) to be combined by the receive indicators combiner 1000 on a per-channel basis. As a result, constructive receive indicators (1, 2, ..., 13) restrain signal transmissions from MAC 900 and baseband unit 902 pairs when a signal reception is occurring on the same channel, even if by a different MAC 900 and baseband unit 902 pair. A downlinked data packet that is transmitted on one channel while an uplinked data packet is being received on another channel does not usually cause the uplinked data packet to be corrupted. On the other hand, a downlinked data packet that is transmitted on a channel while an uplinked data packet is being received on the same channel does usually cause the uplinked data packet to be corrupted (e.g., indistinguishable, non-communicative, etc.), even if the transmission and reception occur via different communication beams 214 (FIGS. 2 and 3).

Channel assignment information 1002 may be implemented as, for example, a vector that relates each MAC 900 and associated baseband unit 902 to one of two or more channels. Hence, prior to a combination generated by the receive indicators combiner 1000, each respective receive indicator (1, 2, ..., 13) can be mapped to a channel segmentation or grouping based on a wireless communication channel used by a corresponding MAC 900 and baseband unit 902 pair.

Receive indicator enable information 1004 provides information for receive indicators combiner 1000 that stipulates which receive indicators (1, 2, ..., 13) are to be used in a combination operation to produce the constructive receive indicators (1, 2, ..., 13). Thus, certain receive indicators may be excluded from the combination operation for one or more operational considerations. The receive indicator enable information 1004 may be implemented as, for example, a masking register 1010 that comprises a register with exclusionary bits for masking one or more of the receive indicators (1, 2, ..., 13) from a combination operation of the receive indicators combiner 1000. In a described implementation, masking register 1010 includes thirteen bits that correspond to the thirteen receive indicators (1, 2, ..., 13), which correspond to the thirteen baseband units 902(1, 2, ..., 13).

Timer logic 1006 can be used for one or more factors and, although only shown once, may alternatively be implemented as multiple components in an exemplary multi-beam directed signal system 206 to account for multiple timer functions, or one implementation may be capable of handling multiple timer functions. Timer logic 1006 includes a watchdog timer 1012 and optionally watchdog interrupt enable information 1014.

For a first factor, timer logic 1006 relates to individual receive indicators (1, 2, ..., 13). A duration of watchdog timer 1012 is set equal to a maximum data packet duration (e.g., a maximum-allowed length of a data packet). Watchdog timer 1012 is started when a particular receive indicator begins indicating that a signal is being received and stopped when the particular receive indicator ceases indicating that the signal is being received. If watchdog timer 1012 is not tolled by an indication of signal reception cessation prior to its expiration, then the signal being received is likely to not be intended for multi-beam directed signal system 206. In this case, timer logic 1006 may indicate that the baseband unit 902 corresponding to the particular receive indicator is not to be used in a combination operation. This exclusion indication may be effectuated using receive indicator enable information 1004 (e.g., by setting a bit in masking register 1010).

For a second factor, timer logic 1006 relates to constructive receive indicators (1, 2, ..., 13) on a per-channel basis. A duration of watchdog timer 1012 is set with consideration of a temporal threshold beyond which a problem or error should be contemplated to have occurred and hence investigated. Watchdog timer 1012 is started when a particular constructive receive indicator (or indicators) for a given channel begins indicating that a signal is being received on the given channel and stopped when the particular constructive receive indicator ceases indicating that the signal is being received on the given channel. If watchdog timer 1012 is not tolled by an indication of signal reception cessation prior to its expiration, then there is a likelihood that an error has occurred.

Watchdog interrupt enable information 1014 is used for this second factor, and it stipulates which channel(s) (and thus which constructive receive indicators) are enabled for interruption. If watchdog timer 1012 expires and the given channel is enabled in accordance with watchdog interrupt enable information 1014, an interrupt is generated and provided to MAC coordinator logic 904 or another component of the multi-beam directed signal system 206.

Scanning logic 1008 may act independently or interactively with any one or more of channel assignment information 1002, receive indicator enable information 1004, and timer logic 1006. For example, scanning logic 1008 can scan across communication beams 214 using different channels on receive to detect which channel or channels have the least or lowest interference levels. This scanning may occur once, periodically, continuously, and the like. A channel assignment vector or similar for channel assignment information 1002 may be configured responsive to such scanning and interference determinations of scanning logic 1008.

As another example, scanning logic 1008 may scan across communication beams 214 to detect the presence of other access points (e.g., non-co-located access points) that are causing interference on a regular or constant basis. The existence of an access point may be inferred by receiving a basic service set identifier (BSSID) being broadcast by another access point. When another access point is detected within a coverage area of a particular communication beam 214 (e.g., when an overlapping subnet is detected), scanning logic 1008 may interact with receive indicator enable information 1004 to mask out a corresponding receive indicator from a baseband unit 902 that corresponds to the particular communication beam 214. As a result, frequent receptions from the overlapping subnet do not constantly prevent baseband unit 902 and MAC 900 pairs on the same channel from transmitting.

In an exemplary implementation, multi-beam directed signal system 206 can be configured such that the receive indicators (1, 2, ..., 13) correspond to the state of the clear channel assessment (CCA) output as detected by baseband units 902(1, 2, ..., 13), and the constructive receive indicators (1, 2, ..., 13) correspond to the state of the clear channel assessment input to MACs 900(1, 2, ..., 13). Based on the values for receive indicators (1, 2, ..., 13), channel assignment information 1002, and receive indicator enable information 1004, MAC coordinator logic 904 determines the constructive receive indicators (1, 2, ..., 13) for each RF component 906 (FIG. 9) (as provided via MACs 900, baseband units 902, etc.).

In an exemplary implementation, MAC coordinator logic 904 is configured to operate such that an indicator "channel_wide_busy" for each channel is defined, where channel_wide_busy is affirmative (e.g., active) if the receive indicator from any baseband units operating on that channel indicates that a signal is being received, excluding those baseband units whose receive indicator enable information is not set (e.g., in masking register 1010). Further, MAC coordinator logic 904 sets the constructive receive indicator for a particular MAC 900 and baseband unit 902 pair to affirmative (e.g., busy) if the receive indicator for that baseband unit 902 indicates affirmative (e.g., busy), or if "channel_wide_busy" for the channel of the particular MAC 900 and baseband unit 902 pair is affirmative (e.g., active).

Figure 11:
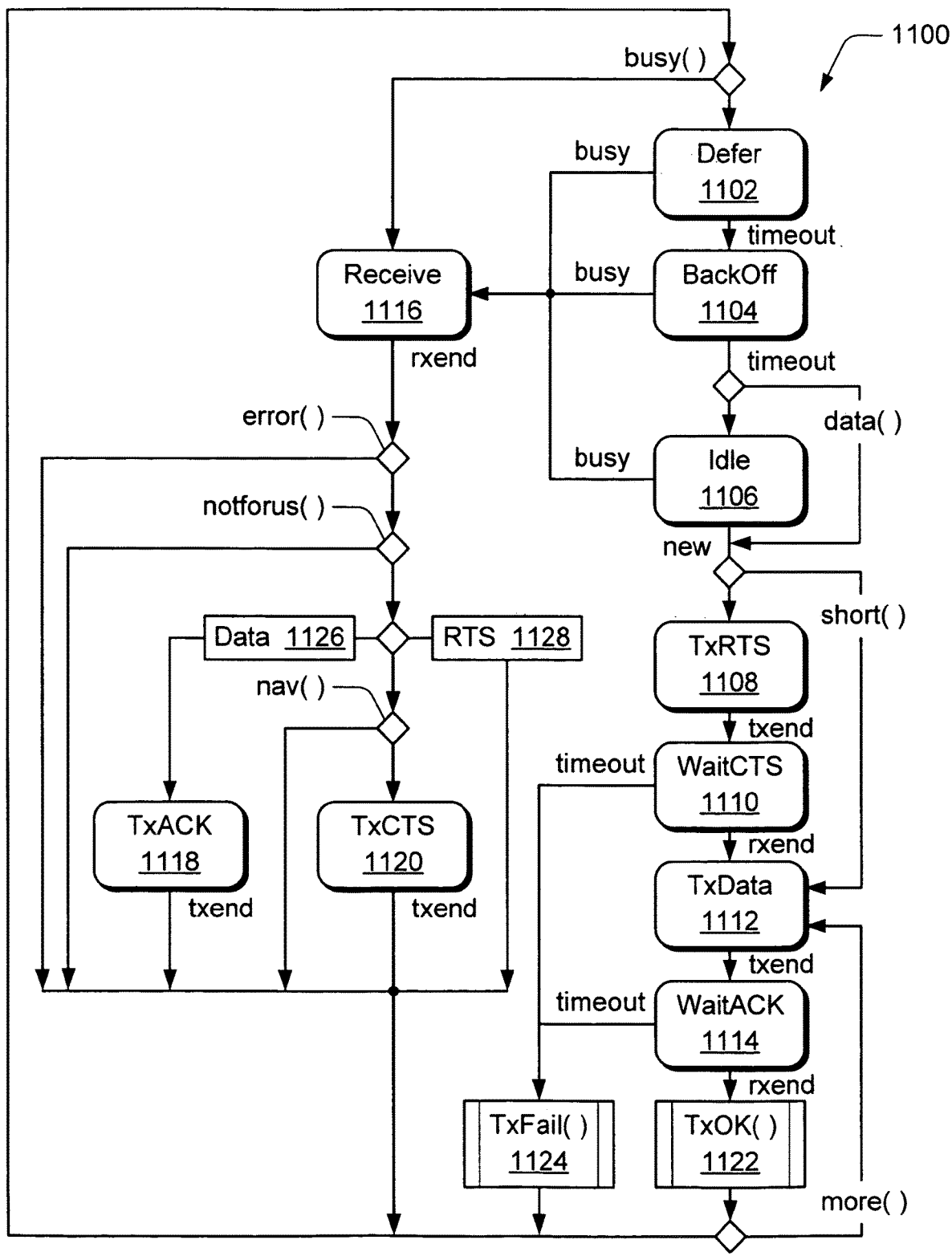
FIG. 11 illustrates a state transition diagram for a medium access controller (MAC).

FIG. 11 illustrates a state transition diagram 1100 for a MAC controller 900 as shown in FIGS. 9 and 10. MAC controller states include Defer 1102, BackOff 1104, Idle 1106, TransmissionRTS (TxRTS) 1108, WaitCTS 1110, Transmission Data (TxData) 1112, Wait Acknowledgement (WaitACK) 114, Receive 1116, Transmission Acknowledgement (TxACK) 1118, and TransmissionCTS (TxCTS) 1120. The state transition diagram 1100 also includes received frame types Data 1126 and RTS 1128, as well as procedures Transmission okay (TxOK( )) 1122 and Transmission fail (TxFail( )) 1124.

The TxOK( ) procedure 1122 removes bytes transmitted from an outgoing queue and resets retry counter(s) and a contention window. The TxFail( ) procedure 1124 increments a retry counter, checks that the number of retries has not been exceeded, and increases the contention window. The Receive state 1116 ends if there is a transmission or check error, if the carrier is lost, or when a duration indicated in a header has elapsed. If there is an error, the Defer state 1102 timeout is set to initiate. If a frame did not have an error and is not addressed to a particular station, and it's duration field is greater than the current timer value, then the timer is set to the value of the frame's duration field.

At the BackOff state 1104, a backoff counter is decremented every slot time and a backoff count is saved if this state is exited due to a channel becoming busy. When the backoff counter decrements to zero and MAC service data units are queued to transmit, the contention window and retry counts are reset. A MAC service data unit is the payload carried by a MAC (e.g., in an 802.11 implementation which will typically be an Ethernet frame). The MAC 900 adds a MAC header and a 32-bit CRC to the MAC service data unit to form a MAC protocol data unit.

Additionally, the state transition diagram 1100 includes various functions that return logical value(s) to control state transitions such as data( ), short( ), more( ), busy( ), error( ), notforus( ), and nav( ). The diagram 1100 also includes PHY indications that initiate a state transition such as busy, timeout, new, transmission end (txend), and receive end (rxend). The PHY indications are asynchronous events (e.g., interrupts) that terminate states for a MAC controller 900. An indication receive end (rxend) identifies that a receiver has detected the end of a frame or an error. An indication transmission end (txend) identifies that a receiver has completed sending a frame. A busy indication is a receiver indication that a channel is busy. A timeout indication is generated when a transition state timer has expired. A new indication identifies that a new frame has been queued.

A busy( ) function returns a receiver indication that a channel is busy, and an error( ) function indicates that a received frame had a CRC error. A notforus( ) function indicates that a frame was not addressed to a particular station, and a nav( ) function indicates that a timer has not expired. A data( ) function indicates that data is queued to send, and a short( ) function indicates that a MAC protocol data unit is shorter than an RTS Threshold and that there are additional data fragments to be sent from a current MAC controller. A more( ) function facilitates obtaining the additional data fragments.

Figure 12:
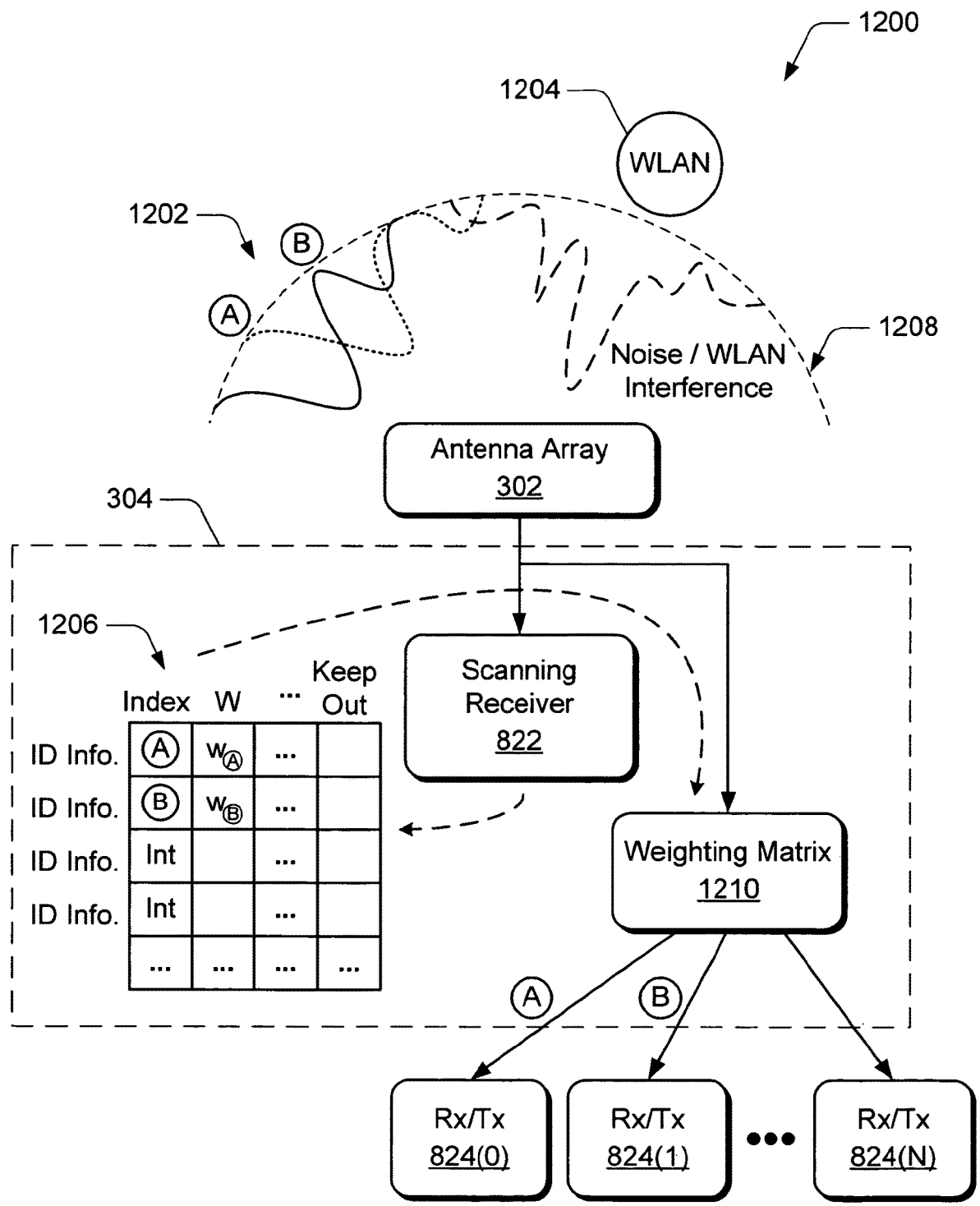
FIG. 12 illustrates a multi-beam directed signal system receiving and weighting various communication signals.

FIG. 12 illustrates an exemplary implementation 1200 of the multi-beam directed signal system 206 that weighs signals received via antenna array 302. Communication and/or data transfer signals are received from sources 1202 (e.g., sources A and B). The signals received from sources 1202 are considered desired signals because they are from nodes within the wireless routing network. Further, signals such as noise and WLAN interference associated with another external wireless system 1204 are not desired.

These signals, both desired and undesired, are received via antenna array 302 and are provided to the signal control and coordination logic 304 (shown in FIG. 3) from the receiver/transmitters (Rx/Tx) 824(0), 824(1), ..., 824(N) (also shown in FIG. 8B). In this example, the signal control and coordination logic 304 includes the scanning receiver 822 that is configured to update routing information 1206 with regard to the received signals. For example, scanning receiver 822 may identify information about different classes of interferers (e.g., known and unknown types) within the routing information 1206. In this example, routing information 1206 includes connection indexed routing table(s) based on identification information, such as address information, CID, and the like. The routing table includes identifiers of the desired sources and other identifiers for the interferers ("Int"). Further, the routing table includes stored weighting values (w) each associated with a particular signal source 1202 (e.g., sources A and B). Other information such as "keep out" identifiers may also be included in this exemplary routing table.

A description of the received signal(s) can be stored in the routing table in the form of the pattern or weighting of the signal(s). In this example, a polynomial expansion in z, $w(z)=w_0+w_1 z+w_2 z^2+w_3 z^3+w_4 z^4+ \ldots +w_i z^i$ can be utilized to establish the values of the weights ($w_i$) to be applied to a weight vector. The routing table(s) may store such weighing patterns as a function of θ, or the zeroes of the polynomial, for example. One advantage of zero storage is that the zeros represent directions for communication that should be nulled out to prevent self-interference or interfering with other nodes or possibly other known wireless communication systems, such as WLAN 1204 that is not part of the wireless routing network, but is operating within at least a portion of a potential coverage area 1208 and frequency bands.

The polynomial expansion in z, w(z), and the zeroes may be calculated from each other and each may be stored. Updates can be generated frequently (e.g., in certain implementations, about every millisecond), and a zero storage system may be more advantageous in most wireless network environments because only a few values will change at a given time. Storing the weighting values will in general require changes to all of the weighting values w(i) when any change in the pattern occurs. Note that w(i) and A(θ) may be expressed as Fourier transform pairs (discrete due to the finite antenna element space). The w(i) is equivalent to a time domain impulse response (e.g., a time domain unit sample response) and the A(θ) is equivalent to the frequency response (e.g., an evaluation of w(z) sampled along a unit circle).

The stored weighting values associated with each connection, data signal, and/or source are utilized in a weighting matrix 1210 which operates to apply the latest weighting values to the received signals and also to transmitted signals. In this illustrative example, subsequently received signals will be processed using the most recent weighting values in the weighting matrix 1210. Thus, as described herein, the multi-beam directed signal system 206 is configured to control the transmission amplitude frequency band and directionality of data packets to other nodes and assist in reducing the effects associated with received noise and interference (e.g., self interference and/or external interference). This is accomplished with the signal control and coordination logic 304 within the multi-beam directed signal system 206.

Figure 13:
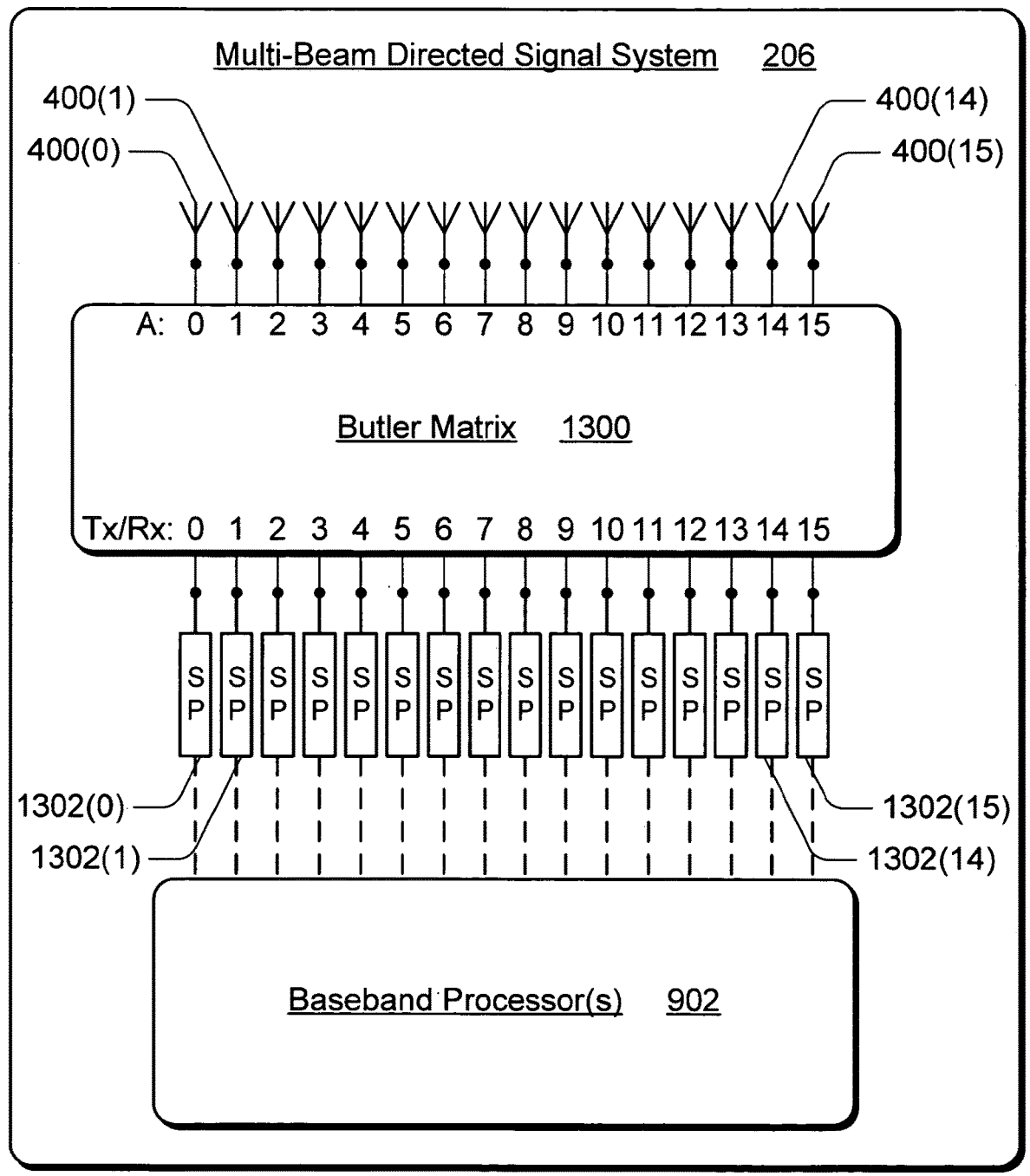
FIG. 13 illustrates an exemplary multi-beam directed signal system that includes various component implementations.

FIG. 13 illustrates an exemplary multi-beam directed signal system 206 that includes an antenna array 302 and a Butler matrix 1300 implemented as a beam-forming network (e.g., transmit beam-forming network 808 and/or receive beam-forming network 810 shown in FIGS. 8A and 8B). The multi-beam directed signal system 206 also includes multiple signal processors (SPs) 1302 and one or more baseband processors (e.g., baseband units 902 described with reference to FIGS. 9 and 10). Baseband processors 902 accept communication signals from and provide communication signals to the multiple receiver/transmitters 824 (FIG. 8B). A separate baseband processor 902 may be assigned to each signal processor 1302, or a single baseband processor 902 may be assigned to any number of the multiple signal processors 1302.

Exemplary Butler matrix 1300 is a passive device that forms, in conjunction with antenna array 302, communication beams 214 using signal combiners, signal splitters, and/or signal phase shifters. Butler matrix 1300 includes a first side with multiple antenna ports (designated by "A") and a second side with multiple transmit and/or receive signal processor ports (designated by "Tx/Rx"). The number of antenna ports and transmit/receive ports indicate the order of the Butler matrix 1300, which in this example, includes sixteen antenna ports and sixteen transmit/receive ports. Thus, Butler matrix 1300 has an order of sixteen.

Although Butler matrix 1300 is so illustrated, the antenna ports and transmit/receive ports need not be distributed on separate, much less opposite, sides of a Butler matrix. Also, although not necessary, Butler matrices typically have an equal number of antenna ports and transmit and/or receive signal processor ports. Furthermore, although Butler matrices are typically of an order that is a power of two (e.g., 2, 4, 8, 16, 32, 64, . . . , $2^n$), they may alternatively be implemented with any number of ports.

The sixteen antenna ports of Butler matrix 1300 are identified or otherwise numbered from A(0, 1, . . . , 15).

Similarly, the sixteen transmit/receive ports are numbered from Tx/Rx(0, 1, . . . , 15). Antenna ports A(0-15) are coupled to and populated with sixteen antenna elements 400(0), 400(1), . . . , 400(15), respectively. Likewise, transmit/receive ports Tx/Rx(0-15) are coupled to and populated with sixteen signal processors 1302(0), 1302(1), . . . , 1302(15), respectively. These signal processors 1302 are also directly or indirectly coupled to baseband processors 902. It should be noted that one or more active components (e.g., a power amplifier (PA), a low-noise amplifier (LNA), etc.) may also be coupled on the antenna port side of Butler matrix 1300.

In an exemplary transmission operation, communication signals are provided from baseband processors 902 to the multiple transmit and/or receive signal processors 1302. The multiple signal processors 1302 forward the communication signals to the transmit/receive ports Tx/Rx(0-15) of Butler matrix 1300. After signal processing (e.g., signal combination, signal splitting, signal phase shifting, and the like), Butler matrix 1300 outputs communication signals on the antenna ports A(0-15). Individual antenna elements 400 wirelessly transmit the communication signals, as altered by Butler matrix 1300, from the antenna ports A(0-15) in predetermined communication beam patterns. The communication beam patterns are predetermined by the shape, orientation, constituency, etc. of antenna array 302 and by the Butler matrix 1300 signal processing. In addition to transmissions, wireless signals such as wireless communications 106 (FIG. 1) are received responsive to the communication beams 214 formed by antenna array 302 in conjunction with Butler matrix 1300 in an inverse process.

FIG. 14 further illustrates an exemplary modified Butler matrix 1300 for a complementary beam-forming, post-combining implementation, Complementary beam-forming is a technique to reduce the effect of communication beam nulls and increase sidelobe levels without a severe power penalty to the main beam. This is done to reduce the effect of the "hidden beam." As described below, increasing the range of 802.11 networks without increased transmit power and using standard clients is possible with adaptive antenna arrays, such as, for example, directional high-gain antennas. Using high gain antennas, it is possible to direct the energy in a given direction and hence increase the range in that direction.

Forming directional transmit communication beams has the side effect of hiding the transmitted energy from some client devices in a CSMA network (i.e., negatively impacting the carrier sense mechanism in the network). A client device measures the energy transmitted from access points and from other client devices. If the client device cannot detect the presence of other transmissions, it attempts to access the medium. Therefore, when directional communication beams are used, many client devices detect the medium as idle when in fact it is busy. This has an effect on the performance of the network and is referred to as the "hidden beam" problem.

In practice, a communication beam (e.g., directional beam) has a main beam whose width can be controlled by the size of the antenna aperture, and sidelobes which vary in different directions. However, these communication beams may have nulls in certain directions that affect the wireless network with a hidden beam. Since a given receiver's energy detect threshold is usually lower than it's decoding threshold, it is possible to direct a high power signal towards an intended client device and yet ensure a minimum transmit power towards other clients in the network so that the signal may be detected by other clients.

Complementary beam-forming ensures a minimum transmit power in all directions while preserving the shape of the main communication beam. The complementary beam-forming techniques also ensure that multiple transmit beams in arbitrary directions are complemented by another beam in all other directions. The complementary beam does not interfere with the intended beams and increases the probability that other users in the network can detect the signal.

The modified Butler matrix 1300 includes the antenna ports 400(0, 1, . . . , N−1, N) and a gain mechanism 1400 configured to modify the signal at output port 400(0). A transmit signal is input to a corresponding input port of the Butler matrix and, in conjunction with the gain mechanism 1400, a complementary beam is formed due to the increase in gain. The result is a directional communication beam from the antenna in a given direction. A complementary beam-forming, pre-combining implementation can also be implemented.

Mathematically, a complementary beam-forming, post-combining implementation may be described as:

$$y_i = \begin{cases} \gamma y_i & i = 0 \\ y_i & \gamma \geq 1 \end{cases} \quad 0 \leq i \leq N-1$$

where $y_i$ is the power applied to antenna element i and $\gamma$ is the gain value contained in the gain mechanism 1400. To ensure the same output power as with no complementary beam-forming, the output voltage on all of the Butler matrix ports can be adjusted by a scaling factor:

$$G_s = \sqrt{\frac{N}{\gamma^2 + N - 1}}$$

The power for the main communication beam will then be:

$$\Delta P = \frac{(\gamma + N - 1)^2}{N(\gamma^2 + N - 1)}$$

or stated in terms of dB:

$$\Delta P_{dB} = 10 \log \left\{ \frac{(\gamma + N - 1)^2}{N(\gamma^2 + N - 1)} \right\}$$

For example, for a sixteen element antenna array 302, if $\gamma=3.5$, then the power loss is approximately 1 dB.

Figure 15:
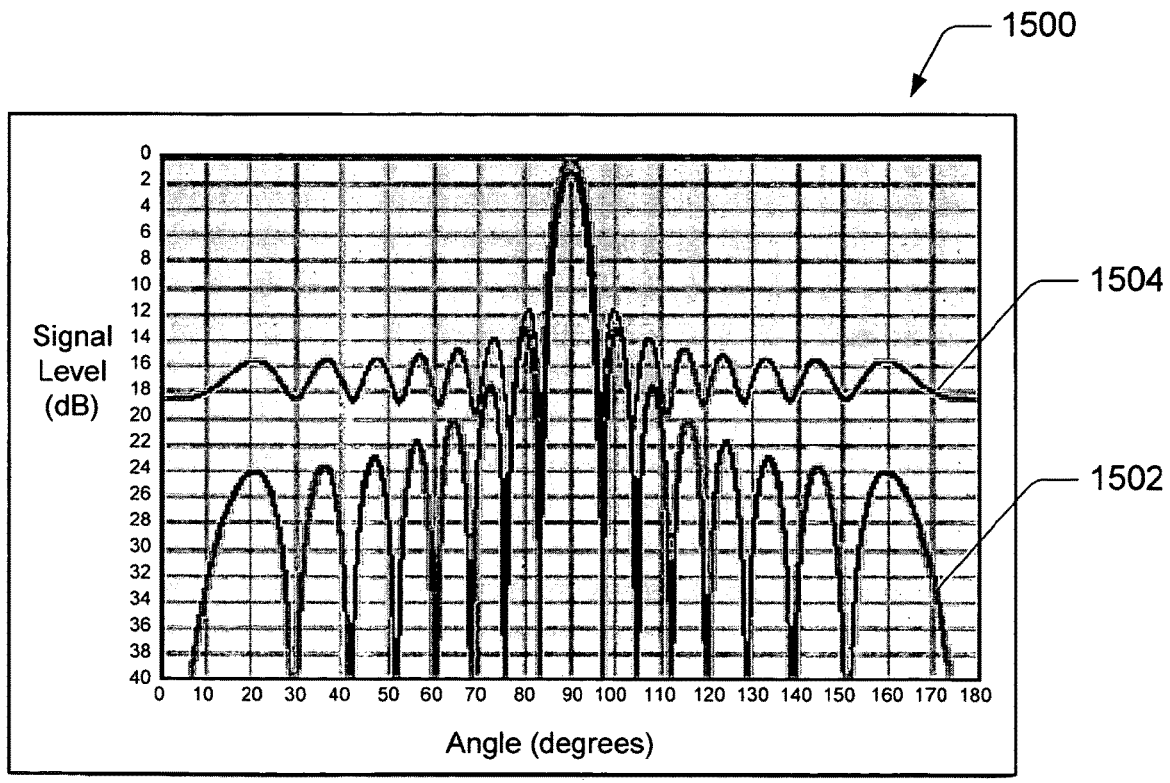
FIG. 15 illustrates a graph depicting a signal level output (dB) for the component implementation shown in FIG. 14.

FIG. 15 illustrates a graph 1500 depicting the signal level output (dB) for certain ports of the modified Butler Matrix 1300 shown in FIG. 14. Graph 1500 depicts the shape of a transmit communication beam 1502 without complementary beam-forming and a transmit communication beam 1504 with complementary beam-forming applied. In this example, the transmit communication beam is derived from a signal at port 400(0) of Butler Matrix 1300. As shown, the output with complementary beam-forming (e.g., transmit communication beam 1504) has higher sidelobes in all directions and removes all of the deep nulls except for the nulls on the main communication beam. The peak power of the main communication beam is approximately one dB lower than that without complementary beam-forming.

Figure 16:
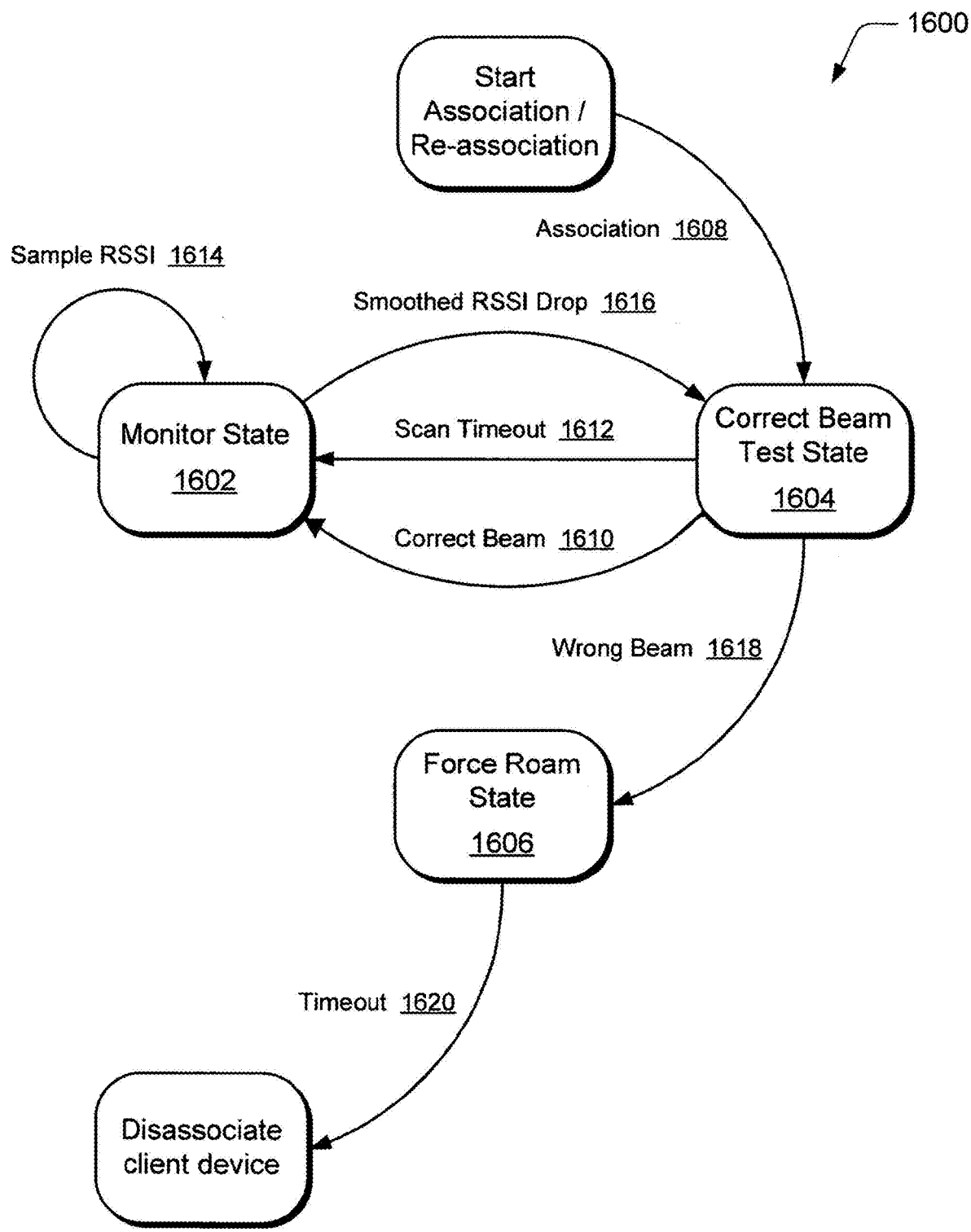
FIG. 16 illustrates a state transition diagram for a roaming client device in wireless communication with a multi-beam directed signal system as shown in FIG. 2.

FIG. 16 illustrates a transition diagram 1600 for a roaming client device that transitions from one communication location within a wireless network system to another. For example, client device 202 (FIG. 2), while in wireless communication with access station 102 via directed communication beam 214(1) may roam (e.g., move, relocate, transition, etc.) such that communication with access station 102 would be facilitated via directed communication beam 214(2). A client device initially associates to one directed signal of the multi-beam directed signal system 206 by selecting the signal (e.g., communication beam) with the best signal at the time of association. However, because the client device may be portable and/or the wireless environment may change (e.g., due to device transitions, interference, etc.), the initially selected directed signal may not provide a continuous, or the best, communication channel over which to communicate information (e.g., in the data packets) and hence the client may have to roam and/or be associated with another directed communication beam.

Roaming is dependent on client device implementation, is initiated by a client device, and may not be directly controlled by the multi-beam directed signal system 206. In most commercially available client devices, roaming is triggered when the channel quality (SNR) falls below a threshold. The channel quality assessment (SNR measurement) is based on received strength of a directed communication beam. To ensure that a client device is associated with the best signal, the multi-beam directed signal system 206 directs the client device to roam to the directed communication beam with the best signal quality using a beam-switching algorithm.

Additionally, to ensure seamless roaming between communication beams, the multi-beam directed signal system 206 implements Inter-Access Point Protocol (IAPP) which is defined by IEEE 802.11f to support interoperability, mobility, handover messaging between directed communication beams 214, and coordination between access stations 102 in a wireless communications environment. Beam-switching can be implemented by the multi-beam controller 816 (FIG. 8B) in the multi-beam directed signal system 206 to ensure that client devices are associated with the directed communication beam 214 having the best signal level and IAPP to ensure client-initiated seamless roaming.

The beam-switching algorithm disassociates a client device once it moves out of an associated main communication beam. However, such movement of a client device is difficult to detect in the wireless environment and disassociation may result in data packet loss and a long association procedure. The effect is particularly significant for client devices located between adjacent directed communication beams. Hence, the beam-switching algorithm will disassociate a client device when there is a determinable difference between signal qualities on different communication beams.

With reference to FIG. 16, a client device may be described as being in a monitor state 1602, a correct beam test state 1604, and a force roam state 1606. In the monitor state 1602, a client device is associated with a directed communication beam 214 while the multi-beam directed signal system 206 (e.g., access station 102) continues to sample and collect receive strength signal indications (RSSI) values for each data packet received from the client device. The multi-beam controller 816 recalculates a new measure identified as a smoothed RSSI value (SmoothedRSSIValue) over an RSSI window size (RSSIWindowSize) and compares it to an RSSI lower control limit threshold (RSSILowerControlLimit).

In the correct beam test state 1604, the scanning receiver 822 measures the RSSIs and calculates a smoothed RSSI value (SmoothedRSSIValue) for the client device on each of the adjacent ports (e.g., communication beams). Samples of the RSSI window size (RSSIWindowSize) for the two adjacent ports are averaged and compared to the same parameter for the current communication beam to determine the best, or most effective, communication beam. In the force roam state 1606, the client device is temporarily disassociated so that it cannot associate to the current directed communication beam.

An association transition 1608 to the correct beam test state 1604 occurs when a client device associates a directed communication beam 214. From the correct beam test state 1604, a correct beam transition 1610 indicates that a current communication beam is the best communication link between the client device and the multi-beam directed signal system. New RSSI values are sampled and a new lower control limit (LowerControlLimit) is recalculated. A scan timeout transition 1612 from the correct beam test state 1604 indicates that the scanning receiver 822 has been monitoring the adjacent communication beams for more than a roaming scan timeout duration (RoamingScanTimeout) without any decision about the correct beam.

From the monitor state 1602, a sample RSSI transition 1614 indicates that the smoothed RSSI value (SmoothedRSSIValue) and the RSSI lower control limit (RSSILowerControlLimit) are re-calculated. A smoothed RSSI drop transition 1616 from the monitor state 1602 drops the smoothed RSSI value (SmoothedRSSIValue) to an RSSI lower control limit (RSSILowerControlLimit). A wrong beam transition 1618 from the correct beam test state 1604 indicates a better communication beam is identified that has an RSSI that exceeds the RSSI of the current communication beam by a signal drop threshold dB (SignalDropThreshold). The client device is disassociated from the current communication beam and a timeout transition 1620 occurs after a roaming time out (RoamingTimeOut). The state information corresponding to the client device is then removed (e.g., deleted, discarded, etc.).

The lower control limit parameter (LowerControlLimit) is calculated using both the mean and the standard deviation of RSSI as follows:

$$LowerControlLimit = \overline{RSSI} - 2\sigma$$

$$\overline{RSSI} = \frac{1}{N}\sum_{i=0}^{N-1} RSSI_i; \; N = RSSIWindow \text{ Size in frames}$$

$$\sigma = \sqrt{\frac{1}{N}\sum_{i=0}^{N-1}(RSSI_i - \overline{RSSI})^2}$$

The $RSSI_i$ is the RSSI value reported for frame i. The N–1th frame is the most recent frame. The smoothed RSSI value (SmoothedRSSIValue (S)) is calculated when RSSI values are sample when a data packet is received. The smoothed RSSI value is calculated as $S_j = 0.1*RSSI_j + 0.9*S_{j-1}$. This value is then compared to the lower control limit (LowerControlLimit) and if it is larger than the limit, the client device enters the correct beam test state 1604. The IAPP seamless roaming enables seamless client-initiated roaming between communication beams within an antenna panel, between antenna panels, and between an antenna panel and third party access points (e.g., access stations, multi-beam directed signal system, etc.).

Methods for directed wireless communication may be described in the general context of computer-executable instructions. Generally, computer-executable instructions include routines, programs, objects, components, data structures, and the like that perform particular functions or implement particular abstract data types. Methods for directed wireless communication may also be practiced in distributed computing environments where functions are performed by remote processing devices that are linked through a communications network. In a distributed computing environment, computer-executable instructions may be located in both local and remote computer storage media, including memory storage devices.

Figure 17:
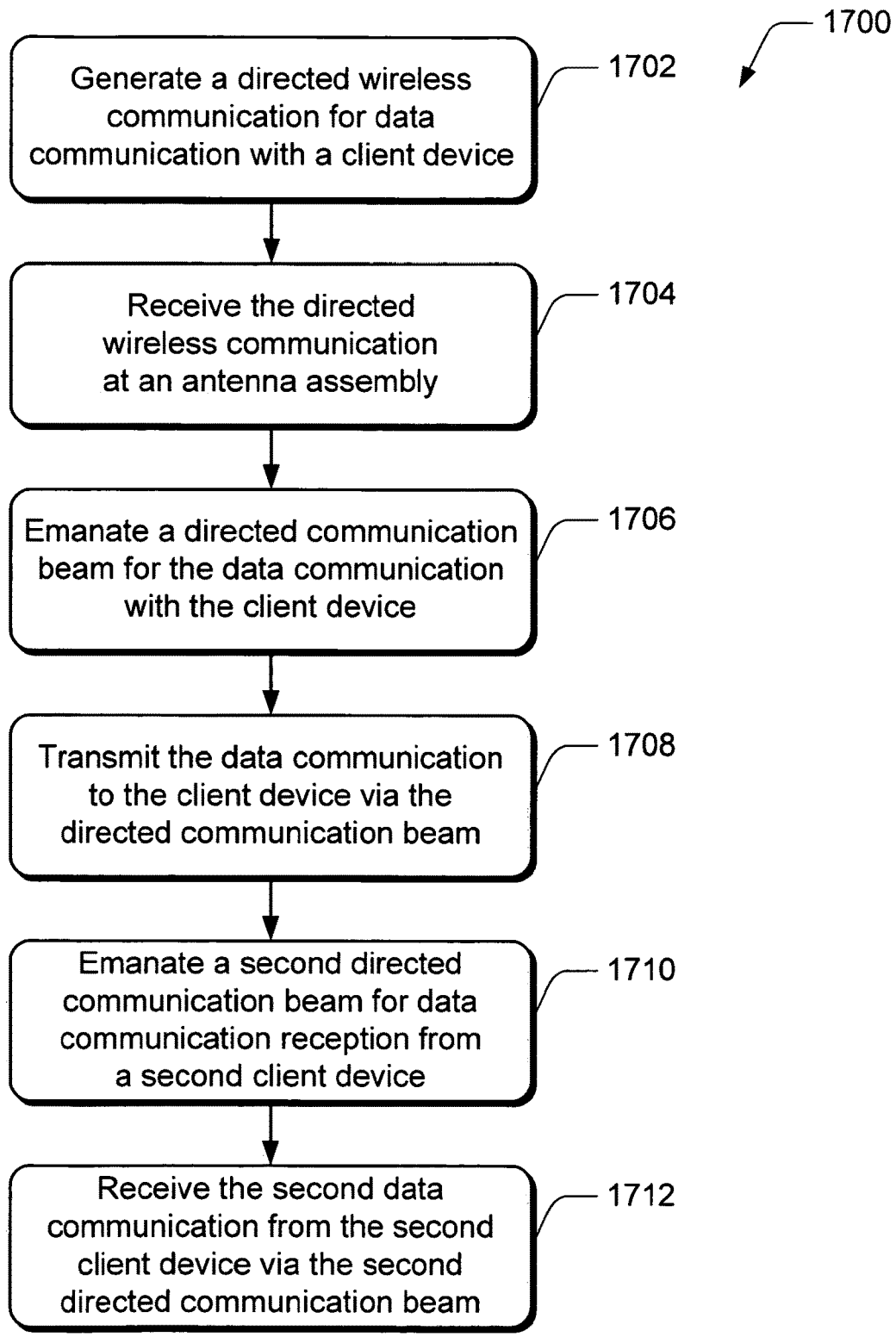
FIG. 17 is a flow diagram of an exemplary method for a directed wireless communication system implemented with a multi-beam directed signal system and antenna assembly.

FIG. 17 illustrates a method 1700 for directed wireless communication. The order in which the method is described is not intended to be construed as a limitation, and any number of the described method blocks can be combined in any order to implement the method. Furthermore, the method can be implemented in any suitable hardware, software, firmware, or combination thereof.

At block 1702, a directed wireless communication is generated for data communication with a client device. At block 1704, the directed wireless communication is received at an antenna assembly, and at block 1706, a directed communication beam is emanated for the data communication with the client device. For example, the multi-beam directed signal system 206 (shown in FIG. 2) generates a directed wireless communication for data communication with client device 202. Antenna assembly 208 receives the generated wireless communication and emanates a directed communication beam 214(1) for the data communication with client device 202. In an embodiment, the directed communication beam can be emanated from two or more antenna elements of the antenna assembly as an electromagnetic signal that includes transmission peaks and transmissions nulls within a coverage area of the directed communication beam 214(1).

At block 1708, the data communication is transmitted to the client device via the directed communication beam. At block 1710, a second directed communication beam is emanated for data communication reception from a second client device, and at block 1712, a second data communication is received from the second client device via the second directed communication beam. For example, an additional directed communication beam 214(N) can be emanated from antenna assembly 208 for data communication reception from client device 204. The data communication transmission (at block 1708) can be controlled so as not to interfere with receiving the second data communication (at block 1712) and optionally, transmitting the data communication and receiving the second directed data communication is simultaneous.

Figure 18:
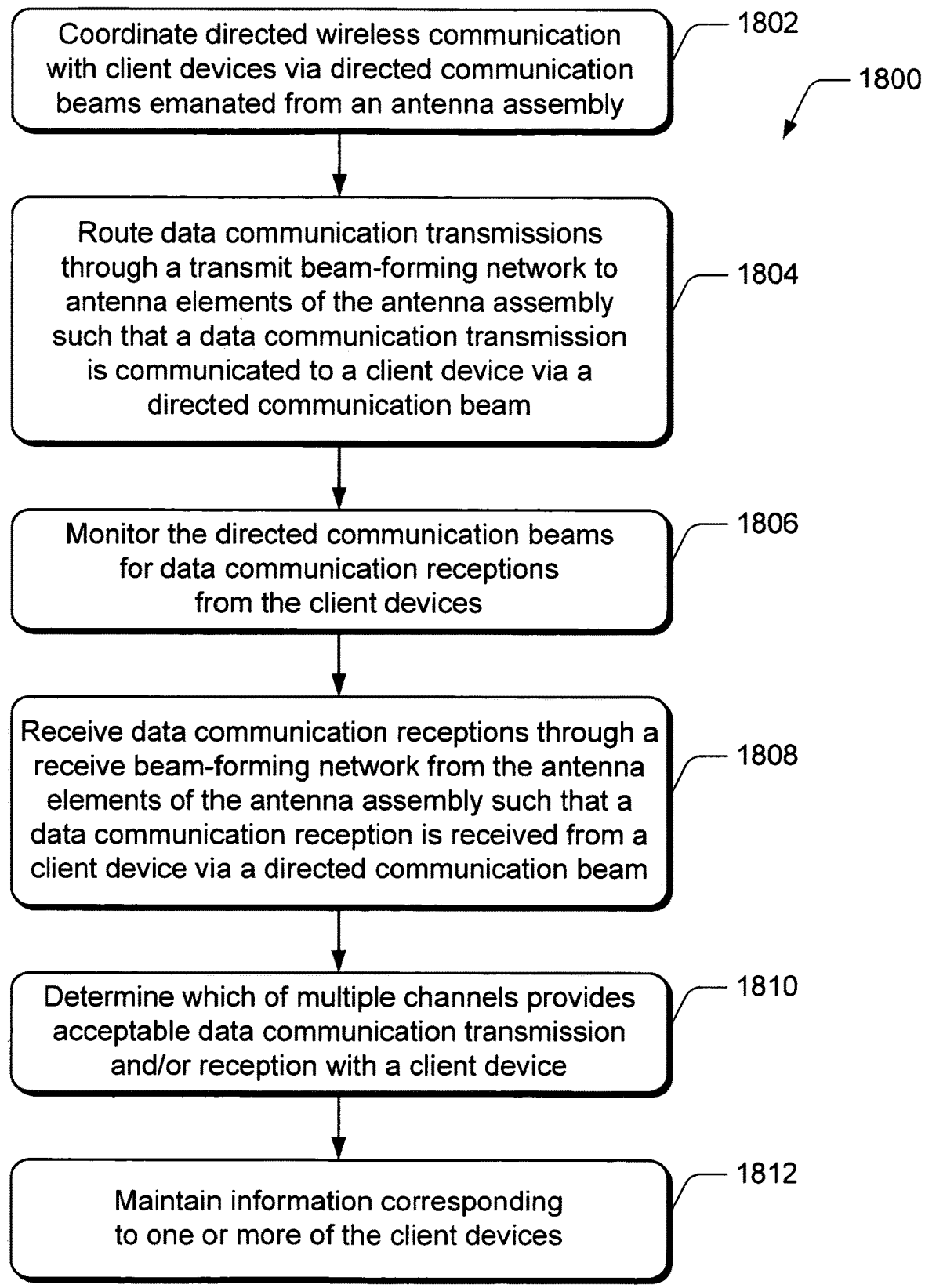
FIG. 18 is a flow diagram of an exemplary method for a directed wireless communication system implemented with a multi-beam directed signal system and antenna assembly.

FIG. 18 illustrates a method 1800 for directed wireless communication. The order in which the method is described is not intended to be construed as a limitation, and any number of the described method blocks can be combined in any order to implement the method. Furthermore, the method can be implemented in any suitable hardware, software, firmware, or combination thereof.

At block 1802, directed wireless communication is coordinated with client devices via directed communication beams emanated from an antenna assembly. For example, wireless communications are coordinated by the signal control and coordination logic 304 (shown in FIG. 3) with client devices 202 and 204 (FIG. 2) via directed communication beams 214(1) and 214(N), respectively, which are emanated from antenna assembly 208. A directed communication beam can be emanated as an electromagnetic signal that includes transmission peaks and transmission nulls within a coverage area of the directed communication beam. Further, energy can be transmitted on a side lobe of a directed communication beam corresponding to a first client device such that a second client device will detect the side lobe energy and recognize that a data communication transmission is being emanated to the first client device via the directed communication beam.

The directed wireless communication can be coordinated such that only client device 202 receives a first directed wireless communication via communication beam 214(1), and such that only client device 204 receives a second directed wireless communication via communication beam 214(N). Coordinating directed wireless communication can include simultaneous data communication transmission to client device 202 via directed communication beam 214(1) and a data communication reception from client device 204 via directed communication beam 214(N). Further, the data communication transmission is coordinated so as not to interfere with the data communication reception.

At block 1804, data communication transmissions are routed through a transmit beam-forming network to antenna elements of the antenna assembly such that a data communication transmission is communicated to a client device via a directed communication beam. At block 1806, the directed communication beams are monitored for data communication receptions from the client devices. At block 1808, data communication receptions are received through a receive beam-forming network from the antenna elements of the antenna assembly such that a data communication reception is received from a client device via a directed communication beam. For example, a data communication reception can be received from a client device with scanning receiver 822 (shown in FIG. 8B).

At block 1810, a determination is made as to which of multiple channels provides acceptable data communication transmission and/or reception with a client device. At block 1812, information is maintained corresponding to one or more of the client devices. The information can include a transmit power level, a data transmit rate, an antenna direction, quality of service data, and timing data. Further, coordinating a directed wireless communication with a client device (as described in block 1802) can be based on the information that is maintained (at block 1812).

Figure 19:
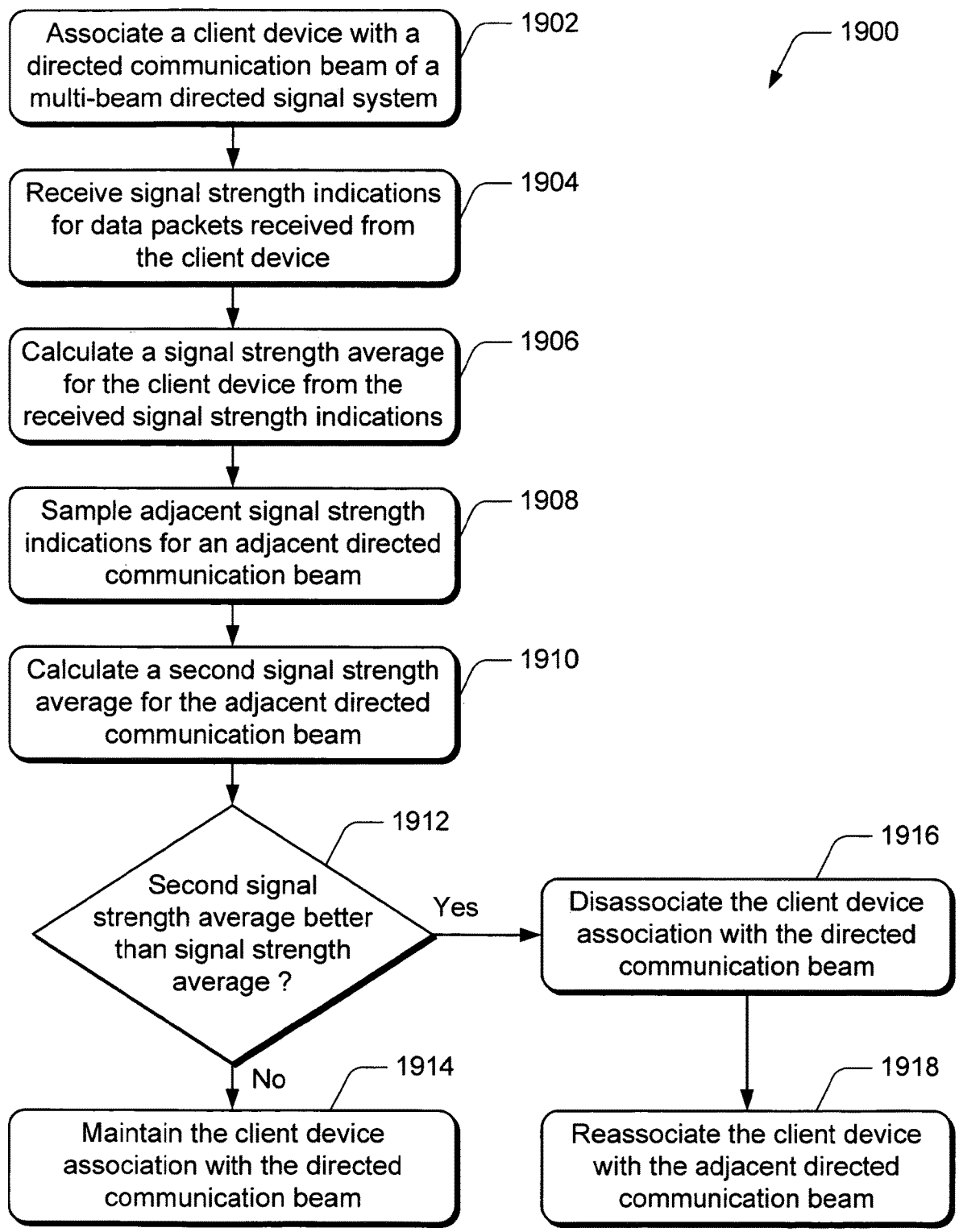
FIG. 19 is a flow diagram of an exemplary method for client device roaming in a directed wireless communication system.

FIG. 19 illustrates a method 1900 for directed wireless communication. The order in which the method is described is not intended to be construed as a limitation, and any number of the described method blocks can be combined in any order to implement the method. Furthermore, the method can be implemented in any suitable hardware, software, firmware, or combination thereof.

At block 1902, a client device is associated with a directed communication beam. For example, a portable client device 202 (shown in FIG. 2) is associated with communication beam 214(1) (shown in FIGS. 2 and 3). At block 1904, signal strength indications are received for data packets received from the client device via the directed communication beam. At block 1906, a signal strength average for the client device is calculated from the received signal strength indications.

At block 1908, adjacent signal strength indications are sampled for an adjacent directed communication beam. At block 1910, a second signal strength average is calculated for the adjacent directed communication beam. For example, signal strength indications are sampled for an adjacent directed communication beam 214(2) (shown in FIGS. 2 and 3), and a signal strength average is calculated for the adjacent directed communication beam 214(2).

At block 1912, the signal strength average is compared to the second signal strength average and a determination is made as to which provides a more effective, or better, communication link. If the second signal strength average does not indicate that the adjacent directed communication beam would provide a better communication link than the directed communication beam (i.e., no from block 912), then the client device association with the initial directed communication beam is maintained at block 914.

If the second signal strength average indicates that the adjacent directed communication beam would provide a better communication link than the directed communication beam (i.e., no from block 912), then the client device is disassociated with the directed communication beam at block 916. At block 918, the client device is re-associated with the adjacent directed communication beam. The method 1900 can then continue and be reiterated from block 1902. Additionally, the method 1900 can be implemented for any number of client devices in wireless communication with a directed wireless communication system.

Although wireless communication system(s) have been described in language specific to structural features and/or methods, it is to be understood that the subject of the appended claims is not necessarily limited to the specific features or methods described. Rather, the specific features and methods are disclosed as exemplary implementations of wireless communication system(s).

What is claimed is:

1. A receiver for use in a wireless communications system, the receiver comprising:
   an antenna, wherein the antenna comprises a first antenna element and a second antenna element;
   a transceiver operatively coupled to the antenna and configured to transmit and receive electromagnetic signals using the antenna; and
   a processor operatively coupled to the transceiver, the processor configured to:
      receive a first signal transmission from a remote station via the first antenna element and a second signal transmission from the remote station via the second antenna element simultaneously;
      determine first signal information for the first signal transmission;
      determine second signal information for the second signal transmission, wherein the second signal information is different than the first signal information;
      determine a set of weighting values based on the first signal information and the second signal information, wherein the set of weighting values is configured to be used by the transceiver to construct one or more beam-formed transmission signals;
      cause the transceiver to transmit a third signal to the remote station via the antenna, the third signal comprising content based on the set of weighting values.

2. The receiver as recited in claim 1, wherein the first signal transmission and the second signal transmission comprise electromagnetic signals comprising one or more transmission peaks and one or more transmission nulls.

3. The receiver as recited in claim 2, wherein the first signal transmission and the second signal transmission are directional transmissions.

4. The receiver as recited in claim 1, wherein the content comprises data configured to be used by the remote station to modify the placement of one or more transmission peaks and one or more transmission nulls in a subsequent signal transmission.

5. The receiver as recited in claim 4, wherein the set of weighting values is further based on one or more of: a transmit power level, a data transmit rate, an antenna direction, quality of service data, or timing data.

6. A receiver for use in a wireless communications system, the receiver comprising:
   an antenna;
   a transceiver operatively coupled to the antenna and configured to transmit and receive electromagnetic signals using the antenna; and
   a processor operatively coupled to the transceiver, the processor configured to:
      receive a first signal transmission from a remote station via the antenna and a second signal transmission from the remote station via the antenna simultaneously;
      determine first signal information for the first signal transmission;
      determine second signal information for the second signal transmission, wherein the second signal information is different than the first signal information;
      determine a set of weighting values based on the first signal information and the second signal information, wherein the set of weighting values is configured to be used by the transceiver construct one or more beam-formed transmission signals;
      cause the transceiver to generate a third signal comprising content based on the set of weighting values;
      determine a plurality of signal strength indications for the first signal transmission;
      determine a first signal strength average based on the plurality of signal strength indications for the first signal transmission;
      determine a plurality of signal strength indications for the second signal transmission;
      determine a second signal strength average based on the plurality of signal strength indications for the second signal transmission; and
      cause the transceiver to generate a fourth signal based on the first signal strength average and the second signal strength average.

7. The receiver as recited in claim 6, wherein the processor is further configured to: cause the transceiver to transmit the fourth signal to the remote station via the antenna.

8. A method in a wireless communications system, the method comprising:
   receiving a first signal transmission from a remote station via a first antenna element of an antenna and a second signal transmission from the remote station via a second antenna element of the antenna simultaneously, wherein the first signal transmission and the second signal transmission comprise electromagnetic signals comprising one or more transmission peaks and one or more transmission nulls;
   determining first signal information for the first signal transmission;
   determining second signal information for the second signal transmission, wherein the second signal information is different than the first signal information;
   determining a set of weighting values based on the first signal information and the second signal information, wherein the set of weighting values is configured to be used by the remote station to construct one or more beam-formed transmission signals; and
   transmitting to the remote station a third signal comprising content based on the set of weighting values.

9. The method as recited in claim 8, further comprising: transmitting the third signal to the remote station via the antenna.

10. The method as recited in claim 8, wherein the first signal transmission and the second signal transmission are directional transmissions.

11. The method as recited in claim 8, wherein the set of weighting values is further based on one or more of: a transmit power level, a data transmit rate, an antenna direction, quality of service data, or timing data.

12. The method as recited in claim 11, wherein the content comprises data configured to be used by the remote station to modify the placement of one or more transmission peaks and one or more transmission nulls in a subsequent signal transmission.

13. The method as recited in claim 12, further comprising:
   determining a plurality of signal strength indications for the first signal transmission;
   determining a first signal strength average based on the plurality of signal strength indications for the first signal transmission;
   determining a plurality of signal strength indications for the second signal transmission;
   determining a second signal strength average based on the plurality of signal strength indications for the second signal transmission; and
   generating a fourth signal based on the first signal strength average and the second signal strength average.

14. The method as recited in claim 13, further comprising:
   causing the transceiver to transmit the fourth signal to the remote station via the antenna.

15. An apparatus for use in a wireless communications system, the apparatus comprising:
   an antenna;
   a transceiver operatively coupled to the antenna; and
   a processor operatively coupled to the transceiver, the processor configured to:
      receive a first signal transmission from a remote station via the antenna,
      the first signal transmission comprising first signal information, wherein the first signal information comprises one or more of: a transmit power level, a data transmit rate, an antenna direction, quality of service data, or timing data;
      receive a second signal transmission from the remote station via the antenna, the second signal transmission comprising second signal information;
      determine a set of weighting values based on the first signal information and the second signal information, wherein the set of weighting values is configured to be used by the transceiver to construct one or more beam-formed transmission signals;
      cause the transceiver to generate a third signal comprising content based on the set of weighting values.

16. The apparatus as recited in claim 15, wherein the first signal transmission and the second signal transmission comprise electromagnetic signals comprising one or more transmission peaks and one or more transmission nulls.

17. The apparatus as recited in claim 16, wherein the processor is configured to receive a fourth signal transmission from an interferer source, the fourth signal transmission being undesired, and the processor is configured to store identifying information concerning the undesired interferer source and the remote station.

18. The apparatus as recited in claim 17, wherein the processor is configured to identify a further interferer signal transmission from the interferer source, and to identify a further desired signal transmission from the remote station, wherein the processor is further configured to prevent the transceiver from transmitting a fifth signal transmission via the antenna during reception of the further desired signal transmission but to allow the transceiver to transmit a sixth signal transmission via the antenna during reception of the further interferer signal transmission.

19. The apparatus as recited in claim 15, wherein the set of weighting values are applied to the third signal, and wherein the transceiver is configured to receive a fourth signal transmitted from the remote station, and the processor is configured to apply the set of weighting values to the fourth signal.

\* \* \* \* \*